United States Patent [19]

Street

[11] Patent Number: 4,552,442
[45] Date of Patent: Nov. 12, 1985

[54] METHOD AND APPARATUS FOR USE IN PRODUCING AUTOSTEREOSCOPIC IMAGES

[76] Inventor: Graham S. B. Street, Impstone House, Pamber Rd., Silchester, Reading RG7 2NU, England

[21] Appl. No.: 562,583

[22] PCT Filed: Mar. 30, 1983

[86] PCT No.: PCT/GB83/00096
§ 371 Date: Nov. 30, 1983
§ 102(e) Date: Nov. 30, 1983

[87] PCT Pub. No.: WO83/03686
PCT Pub. Date: Oct. 27, 1983

[30] Foreign Application Priority Data

Apr. 7, 1982 [GB] United Kingdom ............... 8210328
Jan. 13, 1983 [GB] United Kingdom ............... 8300843

[51] Int. Cl.⁴ ........................................... G03B 35/00
[52] U.S. Cl. ..................................... 354/112; 354/86; 354/115
[58] Field of Search ............... 354/112, 114, 115, 117, 354/102, 84, 85, 86

[56] References Cited

U.S. PATENT DOCUMENTS

| 3,657,981 | 4/1972 | Benton | 354/112 |
|---|---|---|---|
| 3,675,554 | 7/1972 | Bonnet | 354/112 |
| 3,748,019 | 7/1973 | Bestenreiner et al. | |
| 3,759,155 | 9/1973 | Bestenreiner et al. | 354/102 |
| 3,882,513 | 5/1975 | Bonnet | 354/115 |
| 4,126,876 | 11/1978 | Jones | 354/112 |

FOREIGN PATENT DOCUMENTS 0009065 of 1980 European Pat. Off. .
1305415 of 1962 France .
2010107 of 1970 France .
2486258 of 1982 France .
1278659 of 1972 United Kingdom .

OTHER PUBLICATIONS

"One Step Holocoder", by A. W. Lohmann, IBM Technical Disclosure Bulletin, vol. 10, No. 10, Mar. 1968.

Primary Examiner—A. A. Mathews
Attorney, Agent, or Firm—Birch, Stewart, Kolasch & Birch

[57] ABSTRACT

Apparatus such as a camera for producing autostereoscopic images comprises imaging means, such as one or more lenses (60,61,68) arranged to capture rays from a range of perspectives of an object field (58) and recording means in an image field such as lenticular film (69), for recording composite stereoscopic information from the object field. Preferably the imaging means includes one or more retroreflectors (62,63) adapted to reture rays substantially along their incident paths. The lenticular film used may be adapted for fast processing.

44 Claims, 12 Drawing Figures

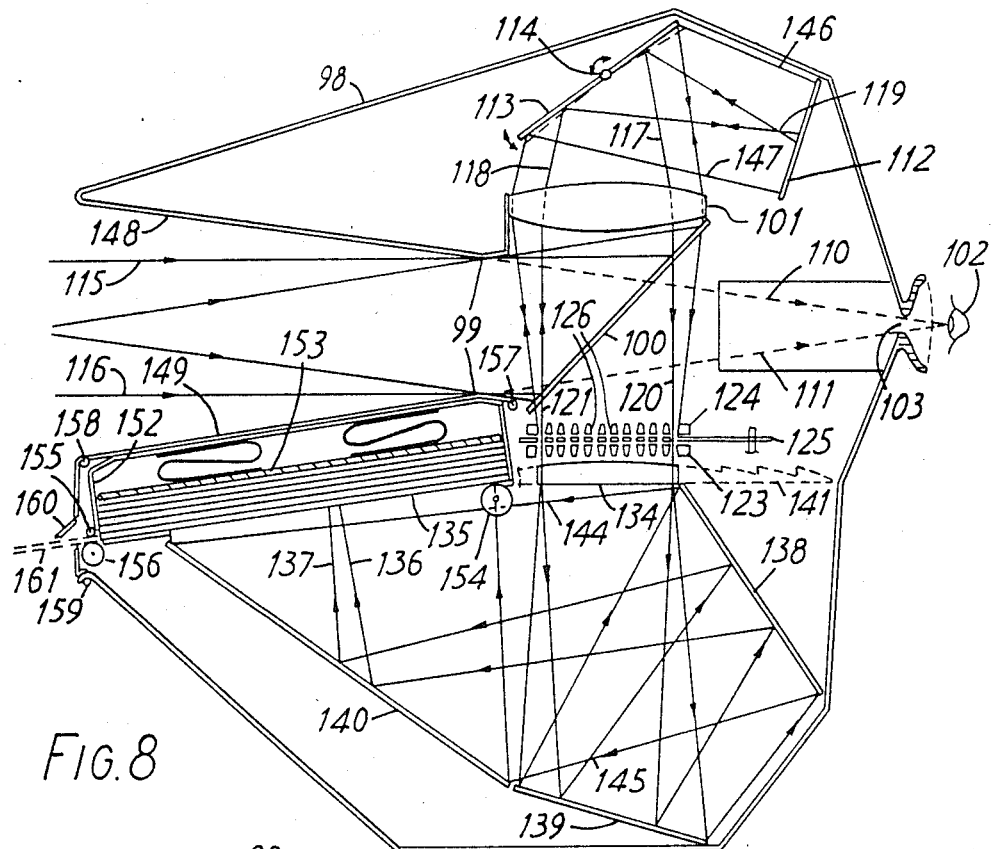
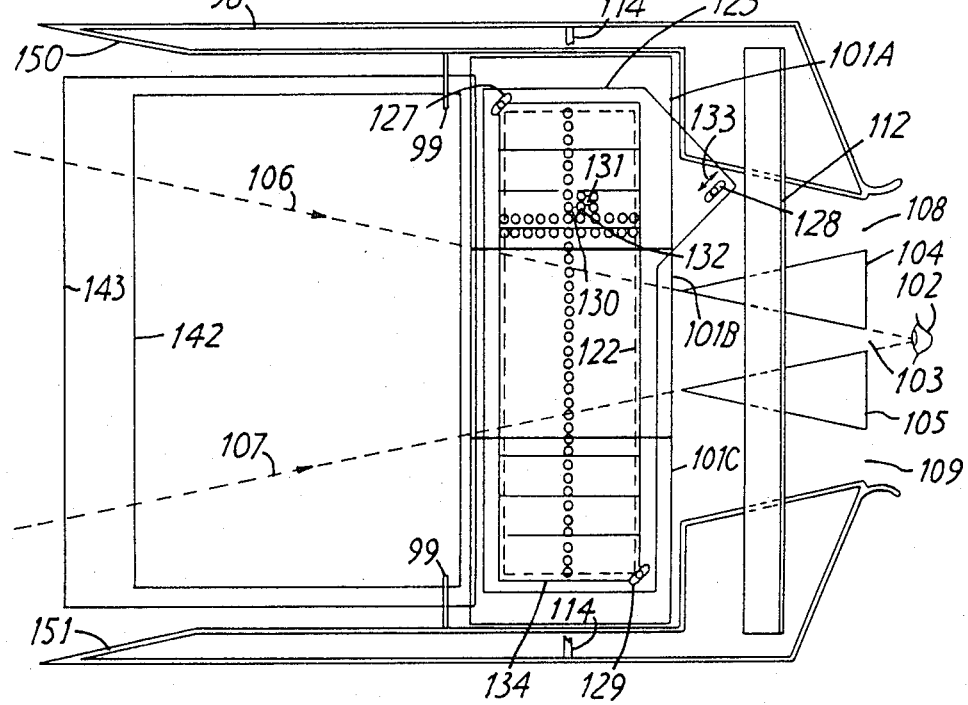
FIG. 8

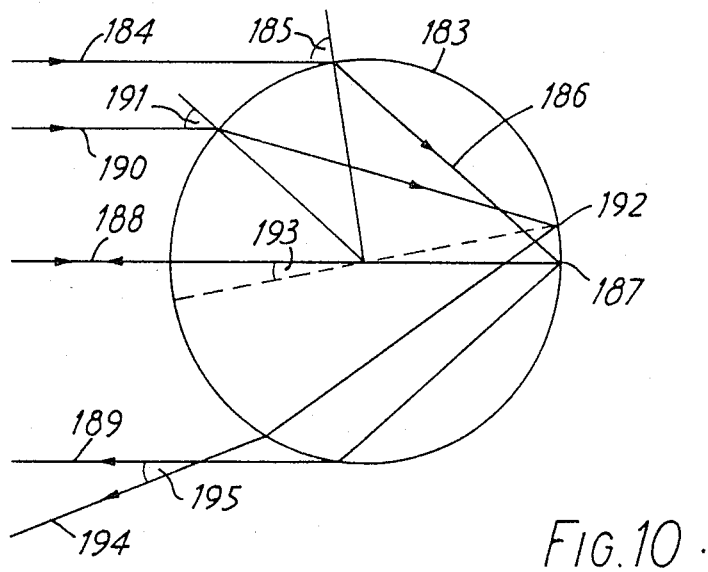
FIG. 10.
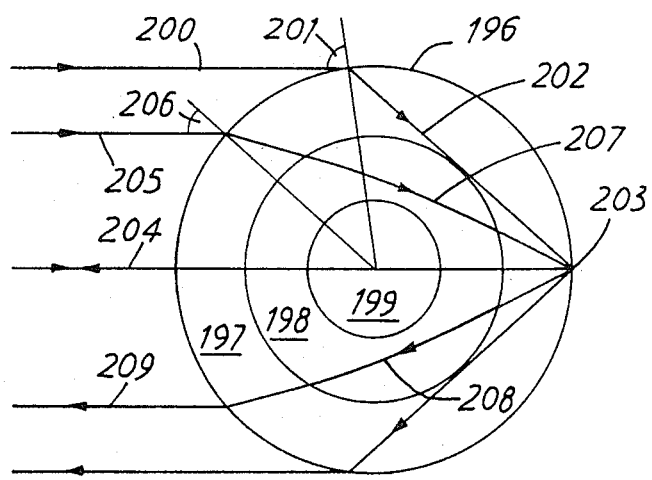

METHOD AND APPARATUS FOR USE IN PRODUCING AUTOSTEREOSCOPIC IMAGES

The present invention relates to a method and apparatus for use in producing autostereoscopic images.

Two main different kinds of method are known for producing autostereoscopic pictures. They are known respectively as "direct" and "indirect" methods. Both involve the use of a lenticular screen arranged in front of a photographic emulsion. After processing a substantially three dimensional reproduction of the original object field is obtained which can be viewed as such without the need for viewing means such as coloured filters, cross-polaroids or other similar aids. Such reproductions are known as autostereoscopic pictures.

The "direct" and "indirect" methods are both widely known, but both suffer from disadvantages. A description of both methods can be found, for example, in U.K. Pat. No. 1,528,362 (Dimensional Development Corporation) which is incorporated herein by reference.

These methods aim to re-create a three dimensional image of the original object field when viewed by an observer. For a completely stationary observer, only two superimposed two dimensional views would be needed, corresponding to the observer's two eye views. In practice, however, depth is perceived to some extent by head movements to change the perspective.

In the "indirect" method, a number of two dimensional views of an object field are taken and processed and an autostereoscopic picture is composed by projecting these images through a lenticular screen having cylindrical lenticules onto photographic emulsion. To be cost effective, the number of views taken is limited and the quality of autostereoscopic pictures produced is correspondingly relatively poor. Better quality pictures can be produced at greater expense by taking a large number of two dimensional views. Careful alignment to ensure proper registration of the two-dimensional views is necessary in the composing step, for which carefully designed apparatus with fine tolerance must be used. Two stage processing is involved and because of this, the "indirect" method is not always suitable for the consumer market, particularly where rapid or instant processing is required.

The "direct" method is carried out in a single camera. In one such method, a lenticular screen in front of the film, which again has cylindrical lenticules, is moved through the width of one lenticule relative to the film during exposure of the film and simultaneously the single camera lens is moved through a proportional distance. The film is processed to produce an autostereoscopic picture. The apparatus required is bulky and expensive because precision movement is involved. This method has not, up to now, been a practical proposition for anything but a very specialist market.

In both of the above prior art methods, a stereoscopic effect is obtained in one direction, for example horizontally, but there is no effect vertically. The lenticular screens used in the production of the pictures and for subsequent viewing have cylindrical lenticules running vertically thus giving a stereoscopic effect horizontally. On pictures produced by the "direct" method very precise registration of the lenticular screen with the interdigitated lineiform images is necessary. Other drawbacks of the two methods are mentioned in U.K. Pat. No. 1,528,362.

The present invention provides a method and apparatus for the production of autostereoscopic images which has, at least in preferred embodiments, considerable advantages over prior art methods. For example, apparatus according to the invention can provide pictures developed by "rapid" processing techniques. The apparatus may be relatively simple, cheap to make and yet pictures of acceptable quality may be obtained by straightforward processing. In certain embodiments, pictures having a stereoscopic effect in both vertical and horizontal directions may be produced.

The invention is concerned generally with a method and apparatus for use in producing autostereoscopic images. The apparatus comprises imaging means which are arranged to capture rays from a number or range of perspectives of an object field and recording means for recording composite stereoscopic information from the object field.

Thus, according to the present invention, there is provided apparatus for use in producing autostereoscopic images, comprising imaging means arranged, for any given position thereof relative to an object field, to accept rays having paths diverging over a range of relatively large angles from respective points in the object field and to focus rays from each said point from a substantial part of said range generally towards a respective image point in an image field, and photosensitive image recording means having a photosensitive layer positioned in said image field such that said rays iminge thereon, with image points at various distances in front of and/or behind the photosensitive layer, whereby composite stereoscopic information from said object field is recorded by said recording means for the production of an autostereoscopic image.

Preferably, the imaging means includes direction-selective means positioned so that rays transmitted from single points in the object field are converged generally towards respective intermediate points at various distances in front of and/or behind said direction-selective means prior to incidence on said recording means, said direction-selective means being adapted such that rays which are generally converging relative to one another prior to impingement thereon become generally diverging after impingement and rays which are generally diverging relative to one another prior to impingement become generally converging after impingement on said direction-selective means.

In certain preferred embodiments, said direction-selective means are adapted to be retrodirective so that for a ray impinging on said direction-selective means at a particular location, there is at least one plane containing said location in which a line of normal projection on said plane of the path of said impinging ray is substantially co-incident with the line of normal projection on said plane of the path of said ray after deflection by said direction-selective means.

The imaging means may include a plurality of imaging surfaces in substantially side by side relationship so that rays from a single point in the object field encounter different imaging surfaces prior to incidence on the direction-selective means and are converged generally towards different intermediate points.

Advantageously, the imaging means also includes partially reflecting and partially transmitting means in the path of rays from the object field, so that transmitted and/or reflected rays from said reflecting and transmitting means are incident on said direction-selective means.

The apparatus may be adapted for movement of the direction-selective means relative to said intermediate points of convergence of rays from points in the object field so as to change the location of impingement of a ray from the object field on the direction-selective means during recording by the recording means.

The recording means may, for example, have a lenticular screen in front of the photosensitive layer with a series of generally cylindrical lenticules thereby giving a stereoscopic effect e.g. horizontally or, alternatively, an array of generally spheroidal lenticules to give changes of perspective both horizontally and vertically.

The invention further provides a camera including apparatus as defined above, in which the recording means includes a lenticular screen in front of the photosensitive layer which comprises photographic emulsion.

The camera, if desired, can include means for fast processing of an image recorded on the photographic emulsion.

Additionally, the invention provides film comprising a lenticular screen and associated photographic emulsion, for use as said recording means and photosensor in apparatus as defined above.

The invention further provides a method for producing autostereoscopic images, comprising positioning imaging means arranged so that for any given position thereof relative to an object field, said imaging means accepts rays having paths diverging over a range of relatively large angles from respective points in the object field and focuses rays from each said point from a substantial part of said range generally towards a respective image point in an image field, positioning photosensitive image recording means, having a photosensitive layer in said image field with said image points at various distances in front of and/or behind the photosensitive, and subsequently recording composite stereoscopic information from said object field on the recording means as rays from the object field impinge on the photosensitive, and processing said information to produce an autostereoscopic image.

The invention will now be described by way of example with reference to FIGS. 5 to 12 of the accompanying drawings, in which:

FIG. 8 shows in plan and sectioned side elevation an embodiment of a camera according to the present invention;

FIG. 10 is a diagrammatic sectional view through a conventional cylinder and a form of cylindrical retro-directive element for use in apparatus according to the present invention;

Figure 1:
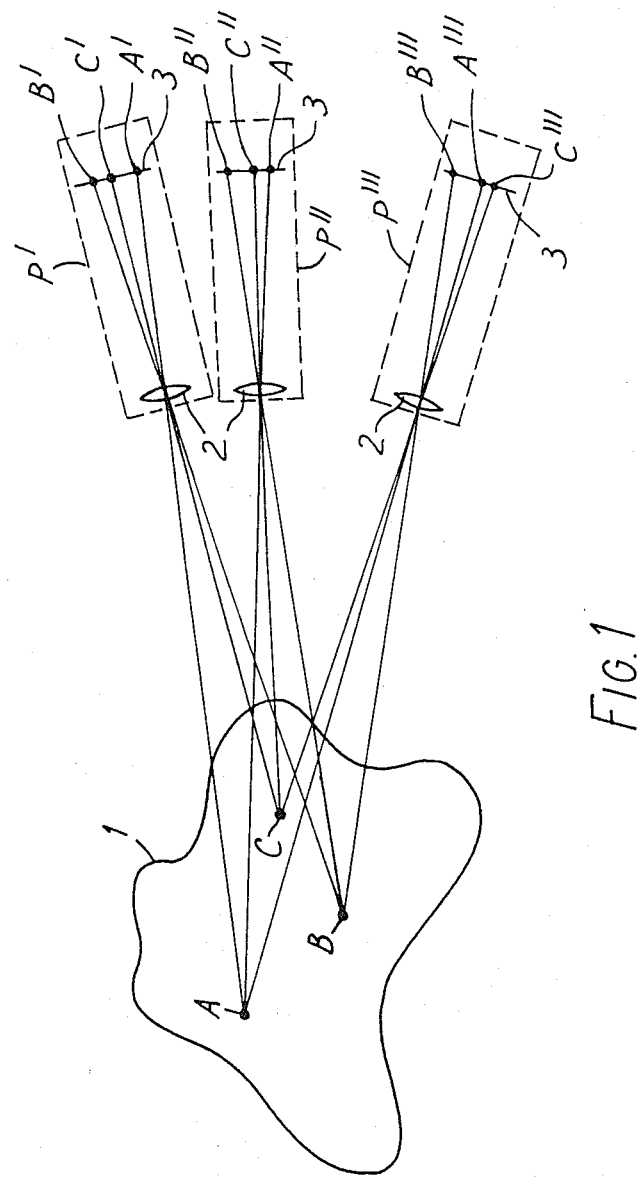
FIG. 1 is a diagram of an object field showing the effects of parallax resulting from a lateral displacement of a camera or an observer.

The effects of parallax, the phenomenon in which the images of foreground and background objects suffer relative displacement as an observer moves his vantage point, are illustrated with reference to FIG. 1.

An object field 1 has three identified points A, B and C. A lens 2 and image plane 3, which represent the lens and film plane in a conventional camera and could similarly represent the lens and retina of the observer's eye, are shown in three different positions P', P" and P''' laterally shifted with respect to each other. The image of point C at position P', designated C', is nearer to B' than A', whereas at position P", the reverse is true. This effect is known as parallax and, if P" is the position of the observer's left eye and P' the position of his right eye, it is this which tells the observer that the point C is in front of A and B. Clearly, as the lateral shift is increased it is quite possible for the image of C to move past that of A as is illustrated at position P''', where A''' now lies between B''' and C'''.

Figure 2:
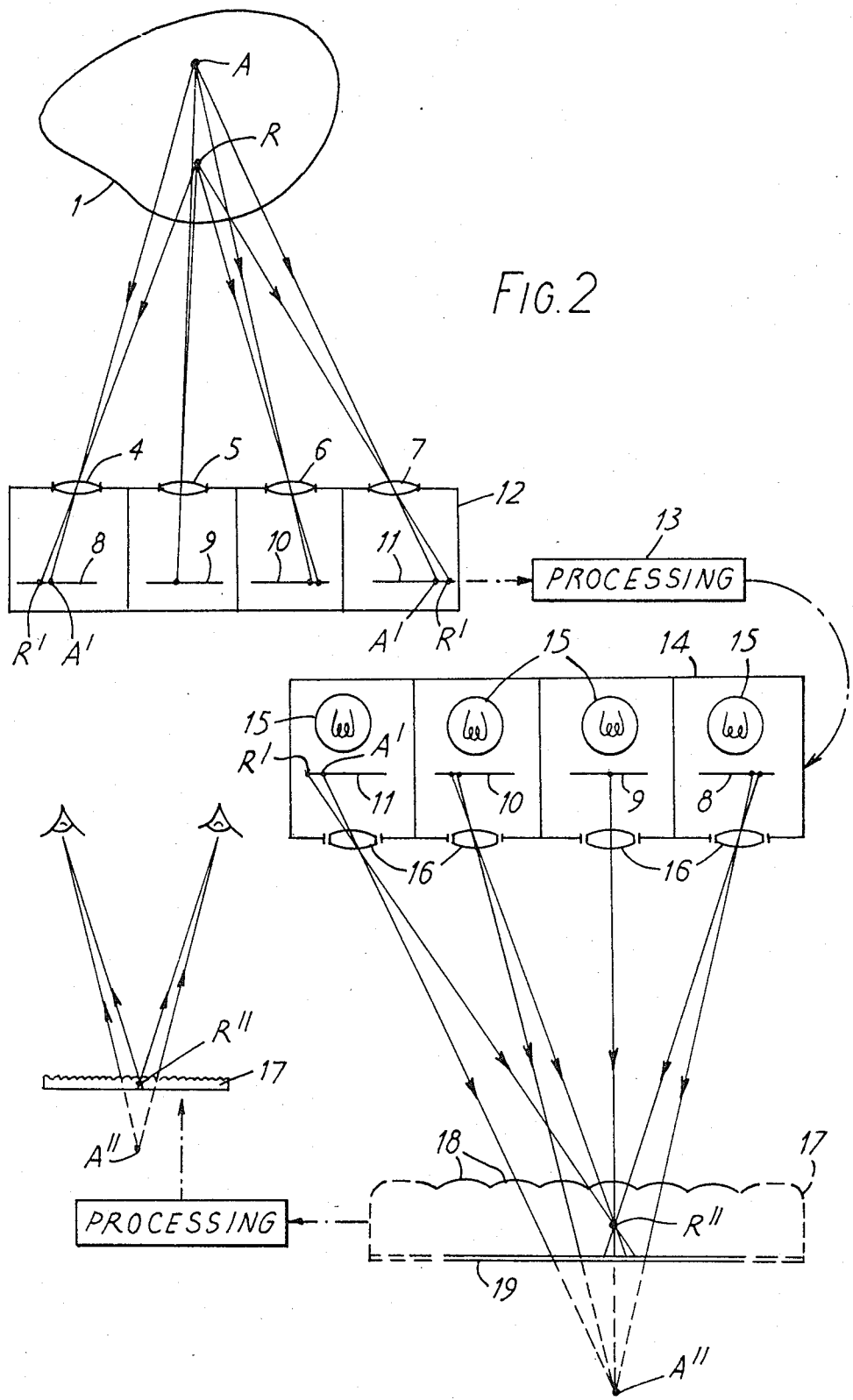
FIG. 2 is a diagrammatic illustration of the prior art "indirect" process for the production of autostereoscopic pictures.

Autostereoscopic lenticular-type pictures can be constructed so that a different view taken from a vantage point corresponding to the eye's position is visible for each of a variety of different eye positions. FIG. 2 illustrates a prior art system, known as the "indirect" method, used to produce such a picture. Four different views of an object field 1 are taken by lenses 4,5,6 and 7, onto respective film negatives 8,9,10 and 11, the whole of this arrangement being part of a camera 12. The diameter of the aperture of each of the lenses is typically of the order of 2 to 5 mm. If the aperture was much larger than this, the depth of field would become too small, and the image produced on each of the film negatives would be blurred because a confusion of perspective would be recorded. Point R in the object field is taken as a reference point. On the negative 8, the image of A, A', lies to the right of R' whereas on negative 11, the reverse is true. Two dimensional images of the object field are produced, each differing slightly. All negatives now pass through a processing stage 13 and are projected by an enlarger or photographic printer 14 in which lamps 15 and corresponding lenses 16 project the various views of the object field 1 onto a lenticular film 17 the front surface of which is constituted by a row of long thin generally cylindrical lenses 18 one focal length from a photographic emulsion 19 on the other side of the film.

At this printing stage, the composing step, the image R" of the object reference point R is used to register each of the views which must be very precisely positioned to achieve this. Object points in the same plane as R will appear to the observer to lie in the plane of the lenticular film 17 once processing is complete, whereas arbitrary points such as A" will appear to lie in front or behind the final print surface. With four negatives, the stereoscopic effect achieved is limited.

Figure 3:
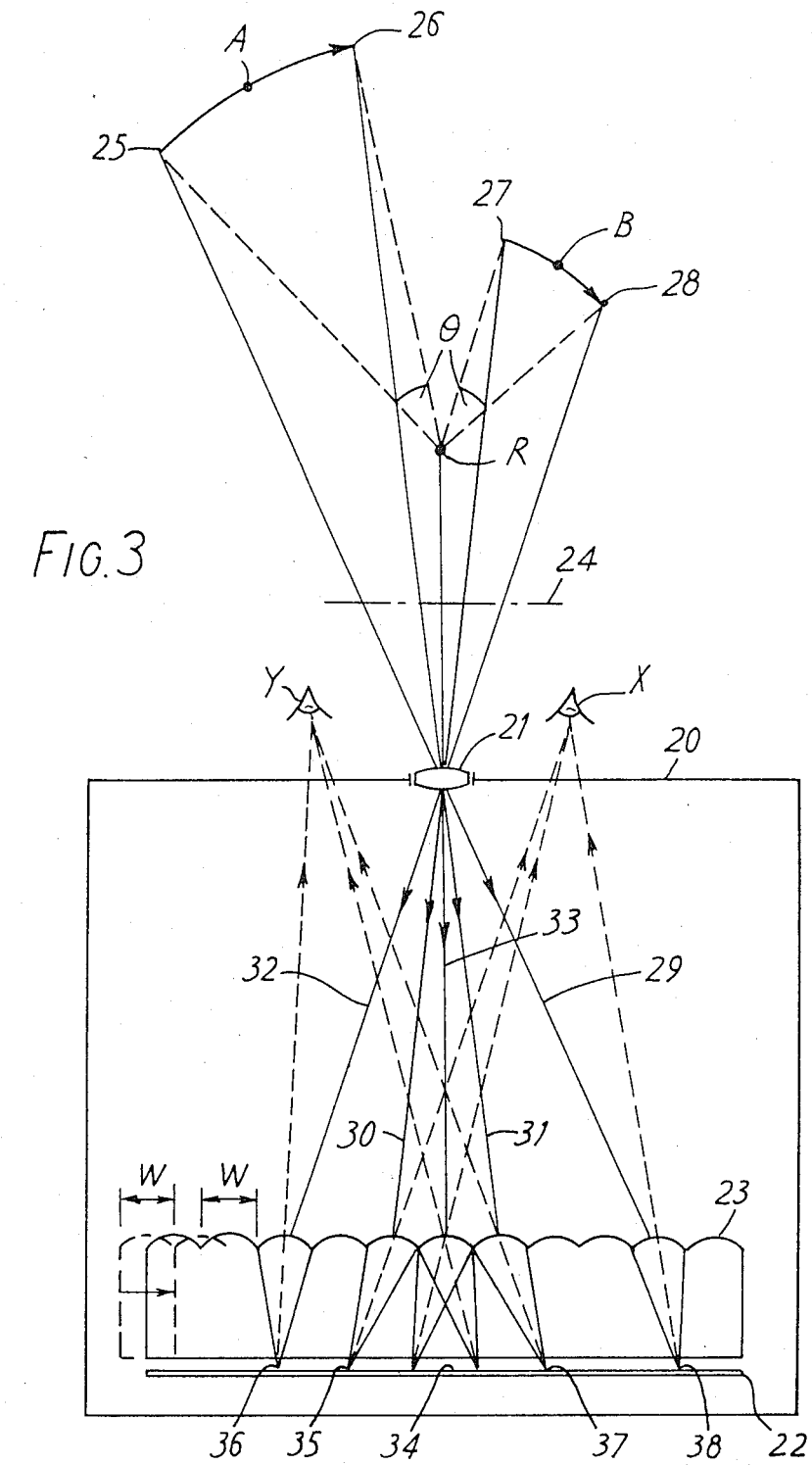
FIG. 3 is a diagrammatic illustration of the prior art "direct" or "in camera" process for the production of autostereoscopic pictures.

The prior art "direct" method, as illustrated in FIG. 3, can give a better three dimensional effect. The primary components of camera 20 are lens 21 and lenticular screen 23 behind which is a film 22. Again, the aperture of the lens is unlikely to be greater than about 5 mm for satisfactory results. The film or emulsion 22 is stationary within the camera, but the lenticular screen 23 is moved laterally by a distance of up to one lenticule width W. The object field is shown schematically by the points A, B and R, with R as the reference point, and the object field is rotated relative to the camera about this point. In practice the camera may be moved in an are around the object field, but for convenience here, the camera is considered to be fixed, while point A moves along a path with end points 25 and 26 and B moves along a path with end points 27 and 28. Each point moves through an angle $\theta$ around the point R and successive views of the object field, each condensed into a series of lineiform images on the film 22 by the screen 23, are recorded at adjacent positions by lateral movement of the screen. The full angle $\theta$ corresponds to a total movement of W, which has the effect of filling the film with the maximum number of distinguishable views.

If the screen, following the processing of the film, is mounted at the midpoint of this travel, an image with substantially improved parallax may be achieved. In FIG. 3, the lenticular screen 23 is shown in its midpoint or "viewing" position. Rays 29 and 30 are recorded at the beginning of the screen's movement at positions 38 and 35 respectively on the film. These image points are "seen" from a left-of-centre perspective X and correspond to positions 25 and 27 of object points A and B respectively. Conversely, positions 26 and 28 (rays 31 and 32 respectively) are recorded at corresponding positions on the film of 37 and 36 respectively. These image points are "seen" from a right-of-centre perspective Y. As point R does not move with respect to the camera, its corresponding ray 33 records a series of images 34 under the same lenticule.

It will be noted that in both of the prior art methods discussed above, a series of different views is taken of an object field through one or more small apertures each of which, to a good approximation, "sees" the object field from a single perspective at any particular instant. The "indirect" method uses multiple lenses and apertures simultaneously while the direct method uses a single combination in a time sequence. Clearly, the direct method is unsuitable for any object field in which there is relative movement between its constituent components.

The apparatus and method of the present invention utilise imaging means arranged to accept rays the paths of which diverge at relatively large angles from respective points in an object field. By way of example one such imaging means in the form of a lens 40 is shown in FIG. 4.

An object field 39 is imaged by a lens 40 of very large aperture including all vantage points from which views of the field are required in order to produce an autostereoscopic picture. In fact a large aperture, for example circular or rectangular in shape, or series of smaller apertures, not shown in FIG. 4, would normally be included in front of or behind lens 40. For clarity, only three points A, B and R of the infinite number of points in the object field or very large number of points of which distinguishable images are to be produced, are considered, and for each of these three rays are traced through the optical arrangement. The angle $\alpha$ between the two extreme rays 42 and 44 from point R is relatively large. That is to say, the lens 40 accepts rays having paths diverging at relatively large angles from the respective points A, B and R. Reverting to FIG. 2, the lenses 4,5,6 and 7 have relatively small apertures and rays from the point R in that Figure diverging at only relatively small angles are accepted by the lenses in order to give clearly focussed two-dimensional images of the object field on the negatives 8,9,10 and 11. Similarly in FIG. 3, lens 21 has a small aperture so that for any given position of the object field relative to lens 40, rays from the point R in that Figure diverging at only small angles are accepted.

Figure 4:
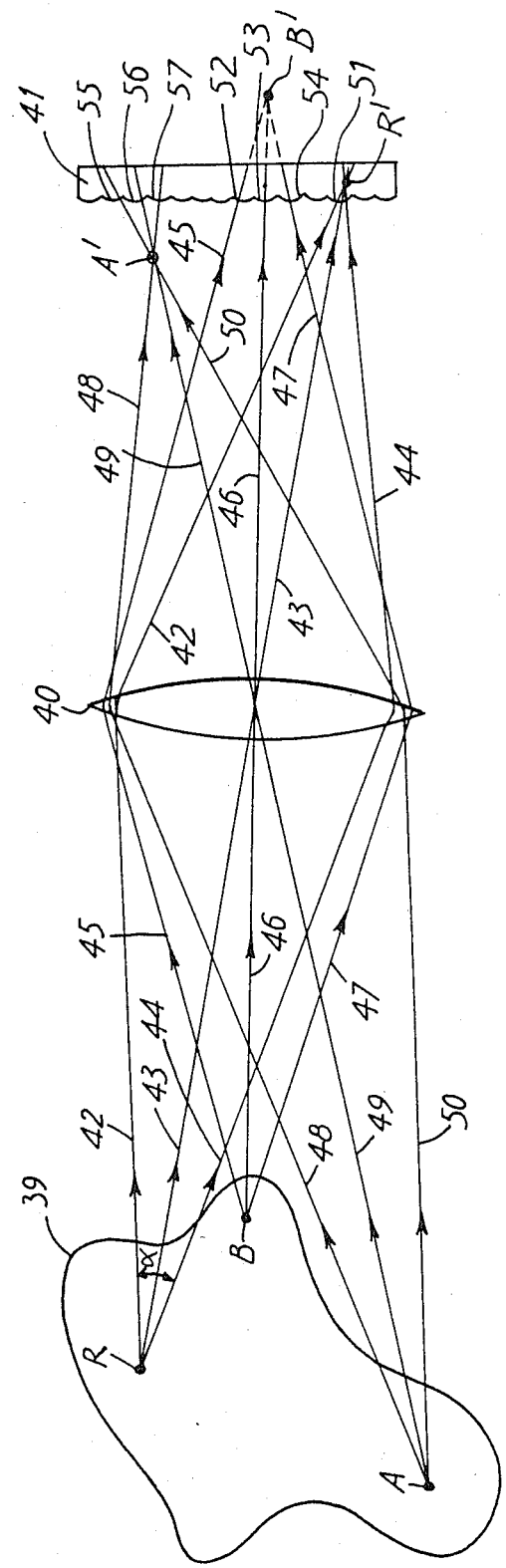
FIG. 4 is a diagram illustrating apparatus for use in producing autostereoscopic images.

By way of example, for an object about two meters away from the lens 40 in FIG. 4, the distance across the aperture of the lens could suitably be around 12 cm, and the angle $\alpha$ around 3.5°. A typical range of possible apertures is 6 to 15 cm. However, apertures outside this range may be appropriate in certain circumstances, particularly if the object is very close to the lens or for very distant objects. For a typical camera producing two dimensional pictures, the aperture width might be 2 to 5 mm and the maximum divergence angle of rays from a point in the object field which pass through the aperture would be less than 0.2°. The aperture sizes in the prior art methods illustrated in FIGS. 2 and 3 would be similar as, in effect, a series of two dimensional images is formed either simultaneously (FIG. 2) or sequentially (FIG. 3). Lenticular film 41 comprises film emulsion behind (i.e. on the side thereof remote from the object field) a lenticular screen. The lenticular screen illustrated is constituted by a series of small lens-like elements in side by side relationship. Each element has a front generally spherical surface and acts to converge rays incident thereon. The film emulsion is formed as a layer on the flat rear surface of the lenticular screen, at the focal plane of the lenticules, and is located in the image field in a plane containing R'. All rays including rays 42,43 and 44 forming this image pass through a single lenticule 51 and expose the emulsion directly behind. When developed and viewed from the lenticule side, the image R' is seen to lie in the film plane. The points A and B are respectively imaged in front of and behind this plane. A' is formed by rays 48, 49 and 50 and when the film is viewed as before, rays travelling in the opposite direction to these from lenticules 57,56 and 55 respectively create the illusion of A' in front of the film. Conversely B' is seen to lie behind the film as a result of rays travelling in the opposite sense to rays 45, 46 and 47 from lenticules 52,53 and 54 respectively. There is a one to one correspondence between points (A, B, R, etc) in the object field and image points (A', B', R' etc) in the image field.

Within the constraints of the system, taking account of the tolerance and spherical and chromatic aberration of the lens and the resolution of the lenticular film, including both lenticule width and grain size of the emulsion, the arrangement as described above has the property of capturing a three-dimensional image. That is to say, the image behind each lenticule is a record of the direction and intensity of each ray passing through it. In this example, spherical lenticules are used with a rectangular or other wide aperture or series of smaller apertures in front of the lens so that variation in the direction of light in both the horizontal and vertical directions is recorded. With cylindrical lenticules, variations of angle could only be accommodated in one dimension and consequently the width of lens aperture would be narrow in one direction (i.e. slit-like).

The image produced is not, in itself, an accurate reproduction of the object field. When viewed, points such as A' which were behind the plane of the reference point R in the object field, now appear to lie in front of this plane and the inverse is true for B'. The image is in fact a substantially unreal one, and is known as a pseudoscopic image. Also, unless the lens 40 is a complex and precisely manufactured optical assembly, the image will have the usual problems of spherical aberration, chromatic aberration and other geometric distortions, particularly if the focal length is comparable to the width of the aperture.

The image thus produced can be used as an intermediate negative. Once developed, this can be projected back through lens 40 or a second similar lens, to recreate a true or orthoscopic image of the object field 39. A lenticular film, placed at the reconstruction of point R, will capture this true image and, providing lens 40 is in the same position with respect to the negative 41, its distortions will be substantially nulled out. This will only be true for chromatic aberrations if colour film is used. If an enlarged or reduced true image is required, an auxiliary lens may be used in conjunction with lens 40 in this second stage.

Figure 5:
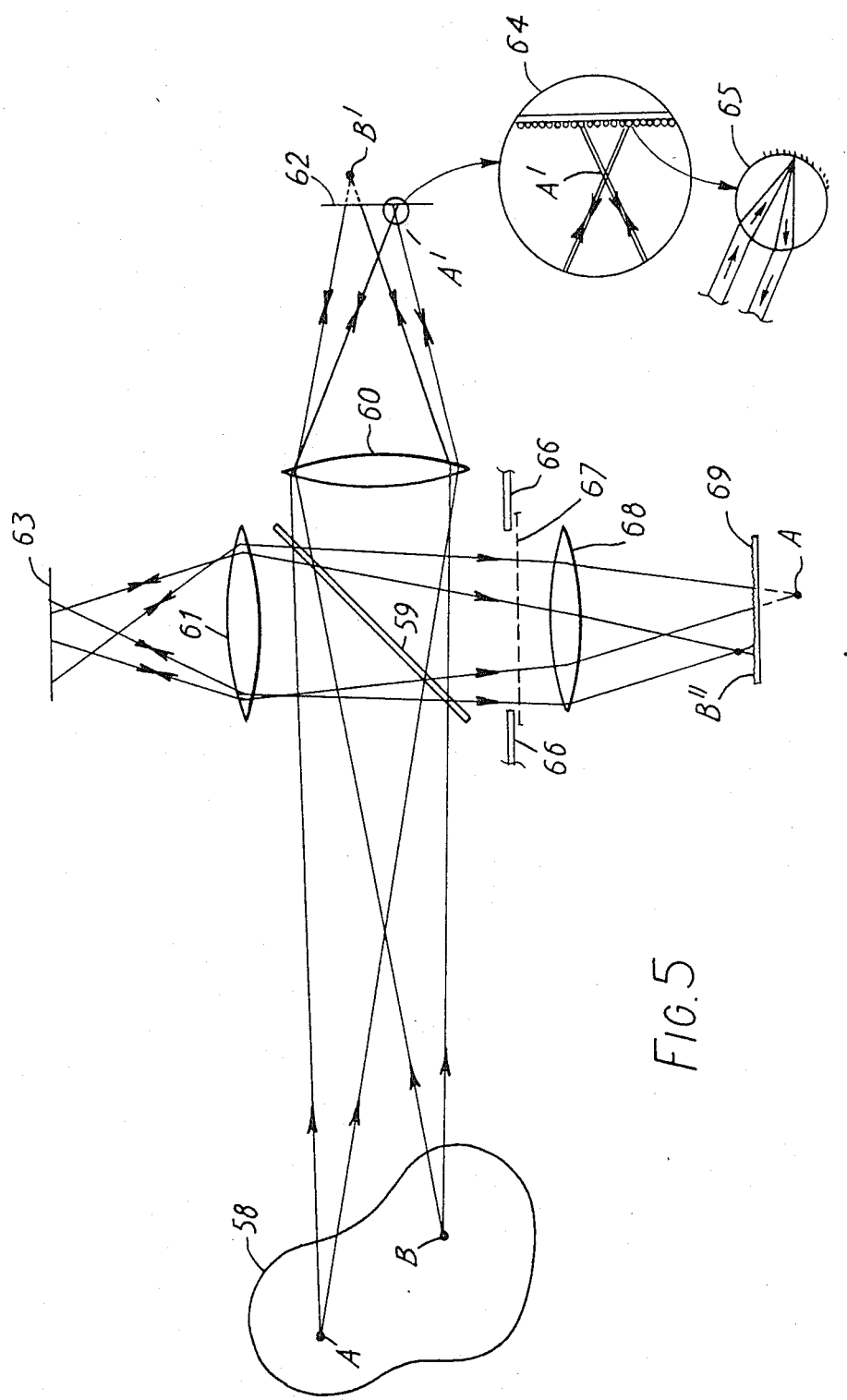
FIG. 5 is a diagrammatic view of an arrangement of optical components in accordance with one embodiment of the present invention.

An embodiment of the invention, in which a satisfactory (orthoscopic) autostereoscopic image can be obtained without an intermediate development step, is shown in FIG. 5. Points A and B are identified in an object field 58, with B nearer the arrangement of optical components, and the object field is imaged by imaging means comprising a wide aperture lens 60. The imaging means also includes a partially reflecting and partially transmitting mirror 59 located between the object field and lens 60. As before, points nearer to the observer are imaged further away. In particular, B' is further from lens 60 than A'.

The imaging means further includes a sheet or screen of retroreflective material 62 placed near an intermediate image of the object field, that is to say, sheet 62 is placed so that some rays transmitted from single points (A,B) in the object field converge generally (allowing for the imperfections in the lens) towards respective intermediate points A',B', point A' being in front and point B' being behind the retroreflective sheet. The retroreflective sheet 62, which is shown in greater detail in enlargements 64 and 65, has retrodirective, or autocollimating, properties. Generally speaking, direction-selective means located in the proximity of intermediate image points act so that for rays impinging thereon at a particular location there is at least one plane containing the location in which rays which were converging prior to incidence become diverging, whereas rays which were diverging prior to incidence become converging. As a result an intermediate image is inverted so that an orthoscopic final image can be obtained, that is to say, points in the background in the object field are seen in the background whilst points in the foreground in the object field are seen in the foreground. Sheet 62 has retroreflective properties and there is not only inversion, but incident rays are deflected and returned substantially along their incident paths. Some loss of course occurs due to imperfections in the sheet 62 and some light is absorbed or scattered instead of being reflected or refracted at the retroreflector. The retroreflective sheet 62 comprises an array of very small transparent balls or beads. Each of these beads, which is close to being spherical to within the accuracy of the system, is made of material with a refractive index which varies as a function of radius, so that parallel light entering is focussed at the rear surface of the sphere, regardless of angle of entry. The rear portion of the surface of each sphere is reflective being coated to give a mirror like finish, so that a ray emerges from the front of each sphere in a direction which is substantially opposite and parallel to its incident path. In practice, the smaller the spheres, the more precisely the lateral position of each ray is preserved in this process. However, as a result of diffraction effects, there is an attendant increase in angular uncertainty. In effect, there is a trade-off between the resolution of the reversed image and the depth of field which can be accommodated. With spheres of approximately 50 $\mu$m (micrometers) diameter, a depth of field of approximately 10 mm can be accommodated, assuming a light wavelength of approximately 0.05 $\mu$m. Given a focal length of, say, 10 cm for lens 60, this would correspond to, for instance, a depth of field at the object ranging from 1 meter to infinity, which is more than adequate for most situations.

Retroreflective sheet 62 is only one form of direction-selective means which could be used. Similar results could be obtained by having a close placed array of small "corner cubes" or triple mirror reflectors, having three generally orthogonal reflective surfaces. These may be formed on the front surface of a supporting sheet or alternatively on the rear surface of a transparent or translucent sheet. Reflecting properties could be achieved by having a metal coated polished surface or any convenient form of reflecting surface. It is not always necessary to avoid diffusion, and a variety of forms of direction-selective elements could be used. The spherical elements described above have good retrodirective properties and return rays close to and substantially parallel to their incident paths, even if the reflecting surface is replaced, for example, by a layer of diffusely reflecting white paint. A ray incident on the rear surface of an element would be diffusely reflected as a series of rays diverging from the point of impingement within a confined range of directions and after refraction at the front surface of the element the rays return as a set of substantially parallel rays along a direction generally parallel to the incident path. The separation between an incident ray and rays in the spread series of returned rays is always less than the diameter of the element on emergence therefrom. The resolution of the autostereoscopic picture ultimately produced by apparatus including direction-selective elements is limited by a number of factors including refraction effects and aberrations of the imaging means, the resolution of the emulsion behind the lenticular screen and the width or diameter of the direction-selective elements. Thus, the spreading effect mentioned above need not be detrimental to the final results. Similar results can be achieved with "corner cubes" by having one or more slightly curved surfaces, giving a spreading effect. The direction-selective sheet will in some, but not all, cases (see FIG. 9) be flat.

Part of the light returned by the sheet 62 is split away from it original (incident) path by the partially reflecting mirror 59 after it has passed back through lens 60. An aperture 66 and a shutter mechanism 67 are located between mirror 59 and film 69 in the image field. After passing through the aperture the light impinges on further imaging means, namely lens 68 which reduces the size of what now becomes a real or orthoscopic image of the object field in which rays from point B in the object field converge towards a point B″ in the image field in front of the film 69 and rays from point A in the object field converge towards a point A″ behind the film 69. Thus rays from points (A,B) in the object field converge towards respective single image points (A″,B″) in the image field. (Note that, strictly speaking, there will be a set of image points very close to one another where direction-selective elements are used but these would normally be so close that they would not be resolved in the autostereoscopic picture produced.) The film 69 is lenticular film which captures, as described above, a full record of the three dimensional image. In practice, lens 68 may conveniently precede the aperture 66 and shutter 67 which may also be encountered in reverse order.

If it is desired to photograph objects very close to the arrangement, the position of film 69 from splitting mirror 59 can be the same as the distance of the object field 58, in which case no lens 68 is required. If the object is very small a three dimensional enlargement could be obtained by moving the object closer to the mirror and using a negative lens instead of lens 68.

A second imaging lens 61 is placed in the path of the component of the light from the object field which is reflected by mirror 59, and a second retroreflective sheet 63 is positioned near the points of convergence of rays from the object field, as described above for sheet 62. It is not essential to include lens 61 and sheet 63, but by doing so the efficiency of the whole arrangement is approximately doubled as this light will also be returned substantially down its incident path and split by mirror 59. In fact, with the possible exception of lens 68, there is no requirement for high quality optical lenses, since any aberrations, whether geometric or chromatic, are almost entirely automatically nulled out as a result of the reversal of all rays by the retrodirective principles here applied.

Figure 6:
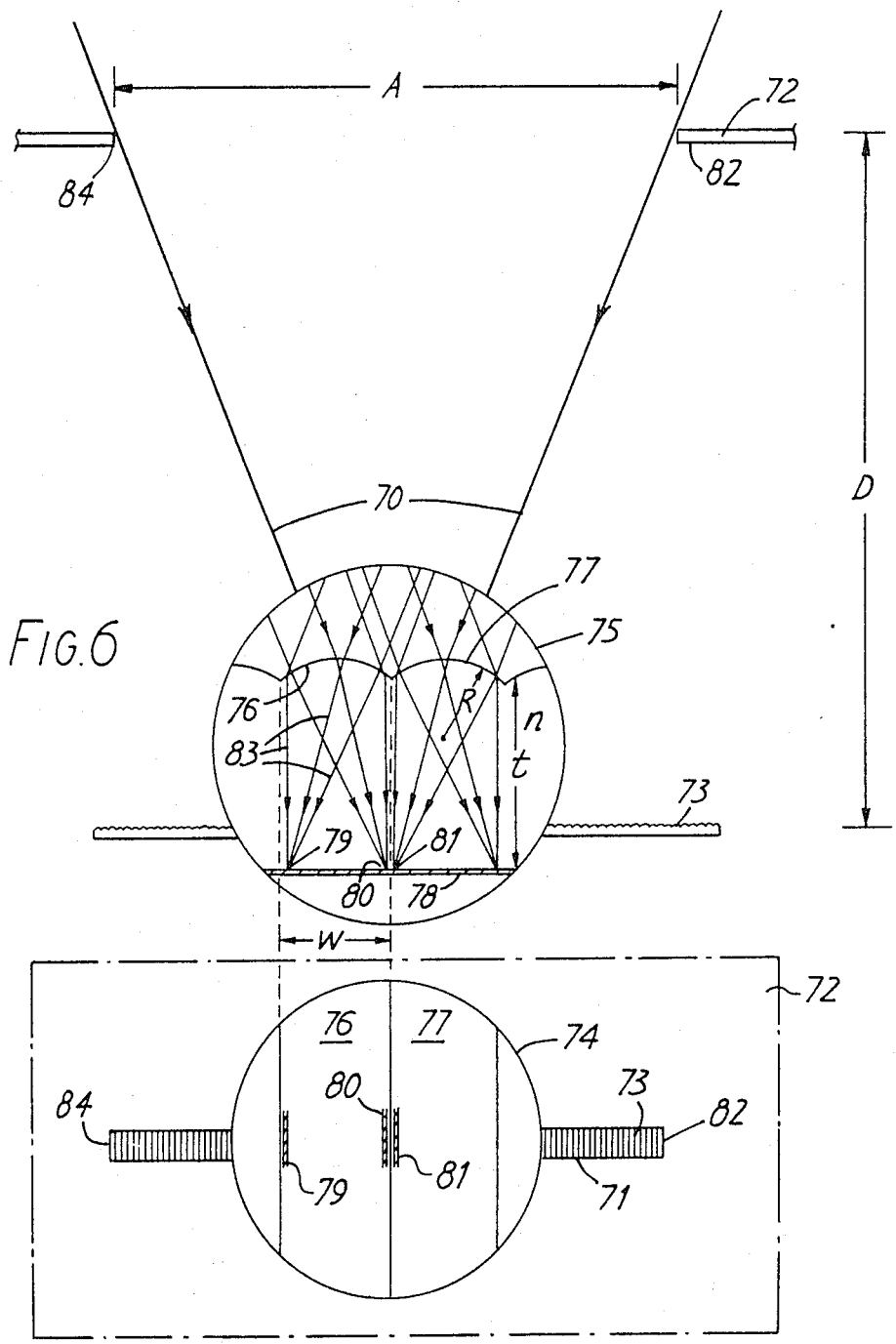
FIG. 6 is a plan and sectioned side elevation of cylindrical lenticular film, for use in apparatus or methods according to embodiments of the invention, showing how its dimensions relate to an associated aperture.
Figure 7:
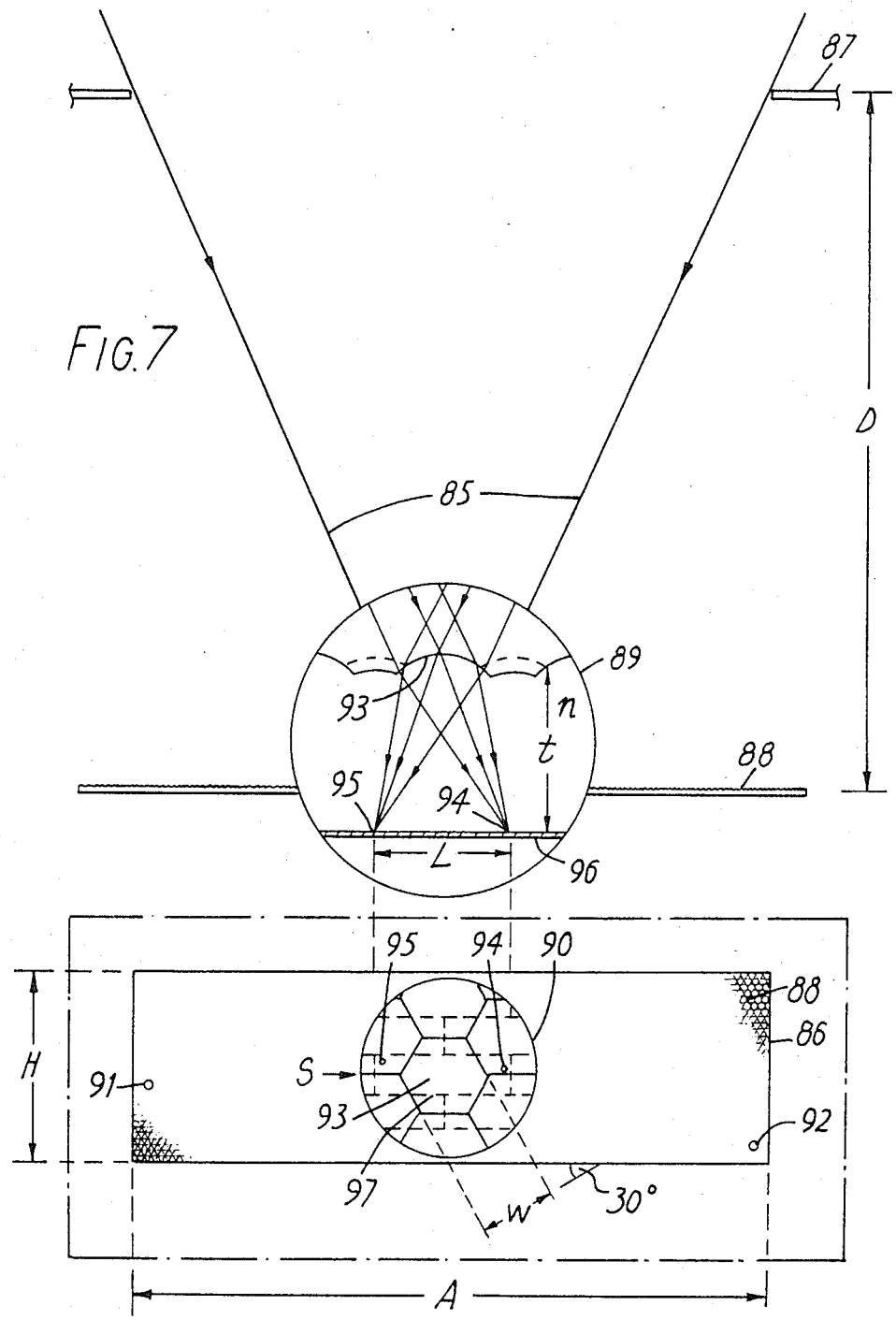
FIG. 7 is a view of spherical lenticular film and one arrangement of components of apparatus in accordance with a further embodiment of the invention.

FIGS. 6 and 7 show, in part, two alternative embodiments of the invention, illustrating in greater detail two types of lenticular film.

FIG. 6 shows the combination of a narrow (horizontal slit) aperture with film having cylindrical lenticules. Part of a plate 72 is shown in plan and side elevation. This would typically form part of a camera arrangement. Imaging means, which suitably includes a mirror, lenses and retroreflector as described with reference to FIG. 5, precedes plate 72. In this embodiment, aperture 66 of FIG. 5 is replaced by a slit 71 forming an aperture in plate 72.

Light 70 from the object field to be photographed is suitably imaged to form an adequately focussed image in the image field at lenticular film 73 which is seen in part through aperture 71 in the plan view. The film 73 comprises a photosensitive emulsion 78 (see detail) behind a series of lenticules (76, 77), each presenting a part-cylindrical surface to rays from the object field incident thereon.

Details 74 and 75 show the pair of lenticules 76 and 77, suitably magnified. Each has width W and a radius of curvature R, so chosen that essentially parallel light entering each lenticule is focussed into a single lineiform condensed image at the rear surface of the film and onto the layer of photographic emulsion 78. This is illustrated in detail with reference to component rays 83 which originate from the righthand end 82 of the aperture 71 and pass through the lenticule 76. This light is condensed into a single narrow stripe 79. Similarly, light originating from the same part 82 of the aperture 71 and arriving at the next lenticule 77 will be condensed into a narrow stripe 81. The separation between these two stripes is essentially equal to the lenticule width W.

Turning to light which originates from the left end 84 of aperture 71, this is focussed through lenticule 76 into a single narrow stripe 80. For this to be an unambiguously recorded image, its separation from stripe 79 must be less than the lenticule width W, otherwise it will interfere with the recorded pattern beneath lenticule 77 which starts with stripe 81. For maximum efficiency, a simple relationship follows between, the length of the aperture, A,
the distance of this from the lenticular film, D,
the thickness of the film, t, and its refractive index, n,
the lenticule width W, in which $A/D = nW/t$, and, hence, for a given aperture size, which will determine the degree of stereoscopy achieved by the picture, the thickness of film is determined by the lenticule width and the distance of the film from the aperture. For example, for an aperture length of 10 cm, distance to the film of 35 cm (a typical viewing distance) and lenticule width of 0.125 mm, the thickness of the film should be 0.656 mm, assuming a refractive index of 1.5. In practice, using cylindrical lenticular film, up to 8 or more lenticules per millimeter (corresponding to a width of 0.125 mm/lenticule) is found to preserve acceptable picture detail. The number of distinguishable views of the object field which are recorded by the process is determined by the lenticule width W and the resolving power of the recording emulsion. For conventional photographic emulsion, this is determined by grain size. For example, if this is 5 $\mu$m, then the maximum number of distinct views of an object field that may be recorded using cylindrical lenticules of width 0.125 mm is 25, ignoring other limitations. In practice, allowing for tolerances in film thickness and focal length of the lenticules, a figure of approximately half this or even less is considered to be more realistic.

Using cylindrical lenticular film of the above form, the present invention allows for the production of autostereoscopic pictures using the direct or "in camera" process which are composed of more than 10 distinguishable views of the object field, each being recorded with a resolution of the order of 8 lines per millimeter. The lenticules illustrated extend fully across the emulsion. Alternatively, shorter cylindrical elements could be used in a staggered relationship. Some imperfections may thereby be introduced, but in certain circumstances there is improved apparent resolution in the autostereoscopic pictures produced.

Turning now to FIG. 7, this shows the combination of a rectangular aperture and spherical lenticular film. Light 85 passes through an aperture 86 in a plate 87 (part shown) to form a suitable image of the object field to be photographed near lenticular film 88 in the image field. The arrangement is once more shown in side elevation and plan for reasons of clarity. In the plan view, the film 88 is seen in part through aperture 86.

The lenticular film 88 comprises an array of lenticules each presenting a part-spheroidal surface. Such a lenticular array is sometimes referred to as a "fly's eye" lens sheet. As used herein, the term "lenticular film" or "lenticular sheet or screen" is to be understood to cover, in general terms, a series or array of relatively small lens-like elements or portions of suitable shape or form, which may for example be generally cylindrical or spheroidal in given circumstances. The series or array may be two-dimensional and sheet-like and could be generally flat or curved. As can best be seen in the plan view, the arrangement in FIG. 7 is a close packed hexagonal or honeycomb structure of spheroidal elements and this has the effect of producing symmetrical picture elements which are very efficiently distributed. Other arrangements could however be used: for example, square or rectangular lenticules could be arranged in straight columns or alternatively staggered as in brickwork.

It is important to note that, with spheroidal or generally spherical lenticules, each lenticule represents a single picture or resolution element (pixel) for each distinct two dimensional view of the recorded image of the object field.

As mentioned above, and in contrast to the embodiment of FIG. 6, the aperture 86 has height as well as length. Within the resolution limitation imposed by the dimensions of the lenticules and the grain size of the emulsion at the rear surface of the film, every ray of light passing through the aperture is recorded in a distinct position at this surface.

Detail 89 is a magnified sectioned side elevation of the film through a plane at position S on detail 90 which is a magnified plan view of the same few lenticules. Light originating from two distinct points 91 and 92 in the plane of the aperture is traced through a single lenticule 93. The ray from point 91 is focussed by lenticule 93 to a point 94 at the rear surface of the film 96. Likewise, the ray from point 92 is focussed to a point 95 at this surface. In general, the whole of the area of the aperture is imaged by the spherical lenticule onto the photosensitive emulsion behind it. By arranging for the long edge of the aperture to be parallel to a straight edge of the lenticules, and choosing the thickness of the film to match various geometric parameters, an unambiguous record may be made behind each lenticule without interfering with that made by its nearest neighbours. This is illustrated by the brickwork arrangement of broken lines 97 shown underneath the hexagonal arrangement of lenticules in detail 90.

For a lenticule width of W (the distance between opposing straight edges) the following relationships apply for maximum efficiency between the length of the aperture A,
the height of the aperture H,
the distance of the aperture from the film, D,
the thickness of the film t and its refractive index, n,
the length of the individual record behind each lenticule, L, $$L = \sqrt{3} \cdot W \quad (1)$$

$$t = \sqrt{3} n W D / A \quad (2)$$

$$H = A/(2\sqrt{3}) \quad (3)$$

For A=10 cms and H=2.89 cms, L, which for a given emulsion resolving power determines the number of distinct views in the long dimension of the aperture, is 0.216 mms for a lenticule width of 0.125 mms, which represents a significant increase in performance when compared to normal cylindrical lenticular film. Spherical lenticules may in fact often be larger than their cylindrical equivalents whilst preserving equivalent picture detail and a value of 0.4 mm for L for example could be used where a cylindrical lenticule width of 0.125 mms would have been needed.

Using the same criteria for distinguishable views as used in the cylindrical case, the long (horizontal) dimension of the aperture will typically capture up to 50 distinguishable views, whilst the short (vertical) dimension will capture up to 15. In principle, therefore, spherical lenticular film will capture a very large number of distinguishable views, each different horizontal perspective having a large number of alternative vertical ones. Even with a lenticule width of 0.125 mm, the number of distinguishable views is calculated to be well in excess of 100. In practice, the number may be lower but nevertheless a large number of distinguishable views is likely to be obtained.

For lenticule width of 0.125 mm, an aperture length of 10 cm and distance to the film of 35 cm, a film thickness of 1.14 mm is required for best results, assuming a refractive index of 1.5. The radius of curvature of each lenticule is chosen to match this thickness.

Referring now to FIG. 8, a camera according to the invention is designed to take "instant" photographs. The camera's major components are shown in a sectioned side elevation, with additional details where relevant given in an associated plan view.

Light from the object to be photographed enters the camera 98 through a rectangular aperture 99, following which it encounters a partially reflecting and partially transmitting mirror 100. The prime function of mirror 100 is to reflect the incoming light towards a wide aperture composite lens arrangement 101, shown in the plan view to consist of three individual but immediately adjacent components 101A, 101B and 101C, each of which is an approximately square and simple spheroidal (biconvex) lens having a curved surface on which rays from the object impinge, with focal length comparable to its cross section (high f-number).

A secondary function of the mirror 100 is to transmit light from the object to the observer's eye 102 through an aperture 103, and, thus, to provide an elegant but simple view-finder. Light baffles 104 and 105 ensure that the edges of the observer's field of view, defined in the horizontal direction by rays 106 and 107 (in plan), correspond to the extremities of the final photograph taken. For some applications it may be desirable to provide binocular vision of the object to be photographed, in which case apertures 108 and 109 are used. In the vertical dimension, the field of view is defined appropriately by the camera's main aperture 99 as illustrated by rays 110 and 111.

The light reflected by mirror 100 is focussed by lenses 101A, 101B and 101C to form three adjacent intermediate images at or near to a retroreflective screen 112 (seen in section and foreshortened in the plan view). The light path to the screen 112 is folded by a mirror 113 which is mounted in such a manner that it can be rotated through a small angle about an axis 114. Two small parts of this mounting are shown in the plan view (without mirror 113). The mirror 113 makes the whole arrangement more compact and also allows the points of impingement of rays from given points in the object field to be scanned over the surface of screen 112 during the exposure of the film. This has the effect of smoothing out local variations and imperfections in the screen 112 and produces a final image on the film without unwanted noise due to the texture of the retroreflective screen itself. Any adjustment of the relative positions of the retroreflector and the points of convergence of rays from points in the object field during the taking of a picture would have some smoothing effect.

Consider now two rays 115 and 116 from a distant object. These rays are almost parallel and represent the most widely separated rays (in the vertical direction) which can enter the aperture 99. They give rise to the maximum degree of vertical parallax when referenced to rays originating from a close object. Each ray is split by mirror 100 and the reflected components are shown as rays 117 and 118 respectively. Lens assembly 101 brings the two rays generally to a focus (allowing for lens aberrations) at a point 119 in front of the retroreflective screen 112, which returns each ray substantially down its original path. Having returned through lens assembly 101, this light is partially transmitted by mirror 100, the two component rays now being shown as rays 120 and 121 respectively. The transmitted light next encounters an array of small apertures, the outer dimensions of this array being shown in the plan view as the broken line rectangle 122. The dimensions of this array are arranged to match those of the camera's main aperture 99.

The aperture array consists of two plates 123 and 124, shown in section, in between which there is a thin movable plate 125, shown both in section and in the plan view in more detail. Each of the three plates in the shutter assembly is perforated with an array of small holes or apertures, over the whole of the rectangular area. Only some of these are shown in the drawing. Circular holes are shown, but other shapes could be used. On the outer fixed plates the apertures 126 are tapered, with the smaller ends of these holes at the centre of the assembly. When appropriately positioned, the holes in the central sheet 125 exactly match the inside dimensions of the apertures in the outer plates 123 and 124. The operation of the shutter is achieved by moving the sheet 125 at an angle of 45° to the edges of the aperture's overall dimensions defined by rectangle 122. Three slots 127,128 and 129, located by associated pins, ensure the correct amount and direction of movement. This movement is determined by the diagonal separation of the individual holes comprising the aperture array. A typical hole in sheet 125 will move from position 130 to position 131 indicated on the plan view during a single exposure. Halfway through this operation, holes, corresponding to position 132 in plates 123 and 124, pass light. The speed and pattern of motion of sheet 125 will determine the level of exposure. A small movement 133 of the central sheet 125 will cause all holes in the shutter assembly to transmit light simultaneously. Successive exposure operations are achieved by reversing the movement of sheet 125. Any inertial effects can be reduced in practice by employing two similar sheets which move in opposite directions.

When the shutter is open to transmit lights, rays 120 and 121 encounter lens 134, whose focal length ensures that the image of the object field being photographed is located at the spherical lenticular film 135, so that rays from some points in the object field converge towards corresponding points in the image field, some in front of and some behind film 135. Ray 120 becomes ray 136, ray 121 becomes ray 137 and these rays converge towards a point behind the surface of the film 135. This fairly long optical path is folded by three mirrors 138,139 and 140. An odd number of mirrors serves the further purpose of righting the image which would otherwise be inverted by the initial operation of mirror 100.

Lens 134 comprises a sequence of rectangular stepped segments, similar to a Fresnel lens. Part of a front elevation 141 is shown (as a broken line drawing) in the side elevation (having been turned through 90°). The plan view shows how these steps on lens 134 are positioned with respect to the holes in aperture plates 123 and 124. This ensures that the steps in the lens's surface do not interfere with the passage of light which would normally pass through one of the small apertures when the shutter is open.

The field of view of the camera is dictated by the area of the film surface 135 to be exposed. This area is shown in the plan view as rectangle 142 inside the outer dimensions of the film sheet shown as rectangle 143. The most extreme rays in the folded optical path following lens 134 are determined by the dimensions of both the aperture array (rectangle 122) and rectangle 142. Two of these rays are shown in the side elevation as rays 144 and 145. The same is true for the most extreme rays passing through lens 101 and, via mirror 113, to retroreflective screen 112. In addition, the divergence of light from aperture 99 before reaching lens assembly 101, and the movement of the image by mirror 113 at screen 112 must be taken into account. The resulting most extreme rays in the vertical direction are shown as rays 146 and 147. The opening angles of the camera's aperture, as defined by surfaces 148 and 149 in the vertical and by surfaces 150 and 151 in the horizontal direction, are arranged to match the angles of entry required for light to reach the edges of rectangle 142 on the film.

The camera incorporates lenticular film including means for fast processing. Fast processing techniques are now well known, and typically the film is withdrawn from the camera shortly after exposure, producing a positive picture a short time, often around a minute, later. Fast processing or so-called "instant" picture film for producing two-dimensional pictures is manufactured, for example, by the Polaroid Corporation under the trade name SX-70 Land Film.

Film of the above general type is adapted for taking autostereoscopic pictures by replacing or supplementing the transparent sheet through which the exposure is normally made by a lenticular screen or sheet of appropriate thickness and optical quality. Apparatus according to the present invention can particularly readily be adapted to take "instant" autostereoscopic pictures by using "instant" lenticular film as described above.

The spherical lenticular film 135 in FIG. 8 is held in the form of cut sheet in a cassette 152. The cassette contains a spring-loaded plate 153 which ensures, by the action of a friction wheel 154 operating on the edge of the film and the two rollers 155 and 156 which extend across the full width of the film, that as each sheet is removed the next sheet is correctly positioned for the following film exposure.

The surface 149 forms part of an assembly which hinges at point 157 behind the cassette 152 and, when opened, this allows the cassette's removal. The assembly is locked into its closed position by a bracket which swivels at point 158 and clips underneath a curved "lip" arrangement forming part of the camera's main casing at point 159. A light trap 160 (normally closed) allows the exposed film 161 to exit from the camera.

Other features necessarily or optionally included in cameras have been omitted from the drawing. For example, mechanical linkages to the shutter assembly sheet 125 and the moving mirror 113 would be needed and also motorisation of the film transport mechanism, wheel 154, rollers 155 and 156, and also of the shutter mechanism, particularly if this is part of an automatic exposure system with associated photo detectors.

The camera of FIG. 8 has an aperture which has significant overall height and is best suited for use with spherical lenticular film. It could be used with cylindrical lenticular film, provided the height of the aperture or array is reduced so as to accommodate the depth of field required for the subject matter.

A camera similar to that of FIG. 8 could be used to take autostereoscopic pictures on normal roll or sheet film. The aperture array described could be replaced by an alternative form of shutter assembly.

Figure 9:
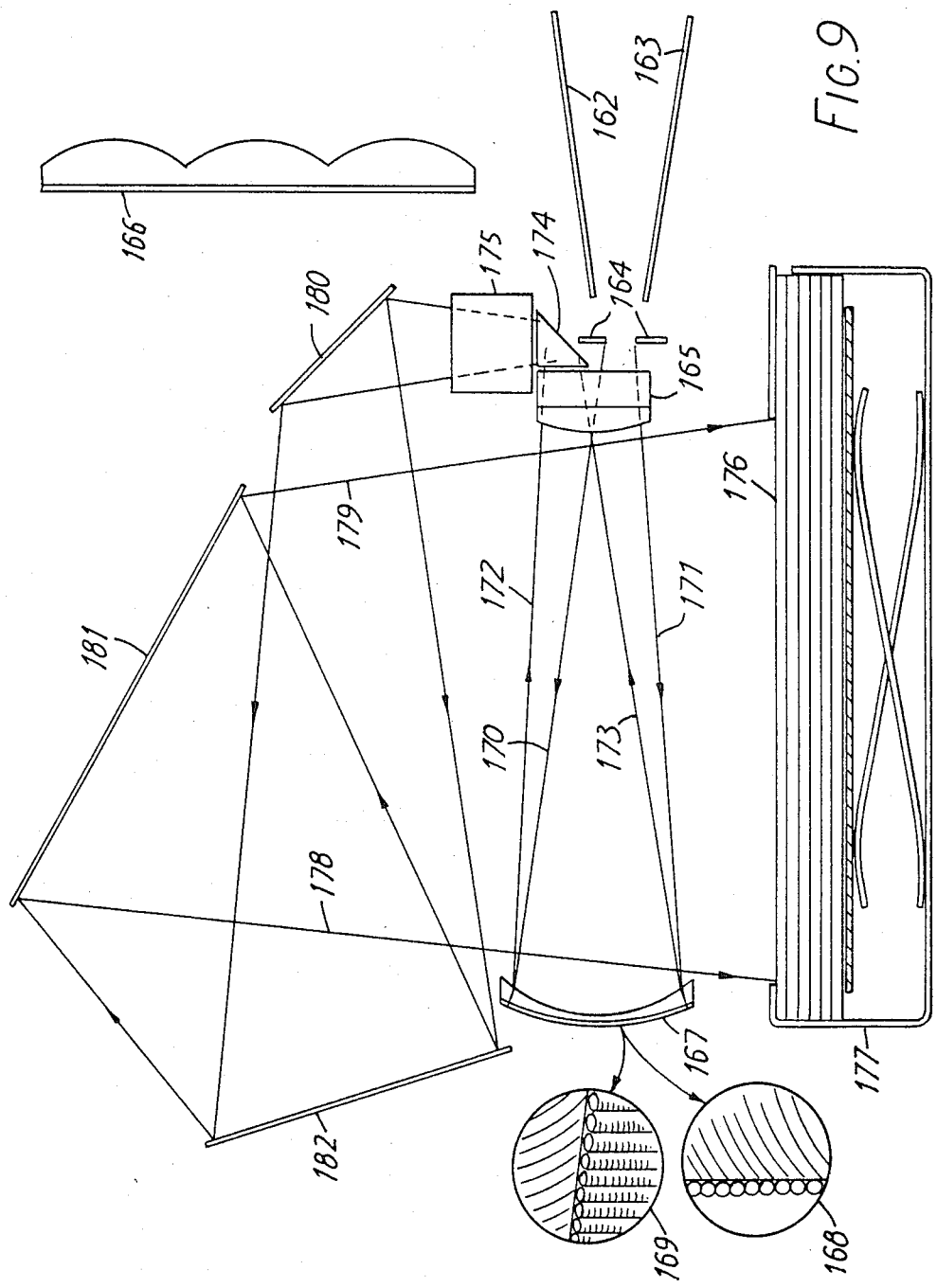
FIG. 9 is a diagrammatic vertical section through a second embodiment of a camera in accordance with this invention for use with cylindrical lenticular film.

FIG. 9 shows diagrammatically certain elements of a camera designed specifically for use with cylindrical lenticular film and adapted for fast processing. The camera works in a similar manner to that of FIG. 8, except for differences which occur in the light paths in the vertical plane.

Light from the object field enters the camera between two surfaces 162 and 163 and passes through a horizontally long but vertically narrow aperture in plate 164 and then through a shutter mechanism (not shown). From the latter, light is incident on imaging means including lens assembly 165 (having some similarities with arrangement 101 in FIG. 8) which is also shown schematically and severely foreshortened in its long dimension for diagrammatic convenience in a plan view 166. This lens has three generally cylindrical surfaces in side by side relationship on the front thereof and a single cylindrical surface on the rear. The direction of curvature of the front three cylindrical surfaces and that of the rear surface are crossed and together converge light from respective points in the object field generally towards respective intermediate points in front of and behind a direction-selective component 167. Some rays from a particular point in the object field will be incident on one of the three surfaces, whilst other rays from the same point will impinge on the second and third surface. Rays incident on different surfaces are converged towards different intermediate points in the vicinity of component 167, so that three intermediate image points are created for a given point in the object field. Light is returned by the component 167 to pass back through the same cylindrical surface. This type of lens arrangement has advantages over a normal convex lens such as lens 60 in FIG. 5 which has two opposed curved surfaces. If lens assembly 165 or arrangement 101 in FIG. 8 was replaced by a single convex lens, the lens would need to have a very large f-number and be quite massive, in order to converge light to intermediate points on direction-selective components 112 or 167 in the positions as shown in FIGS. 8 and 9, respectively. By increasing the distance between the normal convex lens and the direction-selective component, a lens having a lower f-number could be used, giving a less compact arrangement.

In the embodiments of FIGS. 5 and 8, the retroreflector caused each ray of light reaching it to be substantially returned down its original (incident) path irrespective of the angle of incidence of the ray. For this reason these arrangements included a partially transmitting and partially reflecting mirror to precede the first lens assembly, in order to separate out the image reconstruction of the object field.

In the embodiment of FIG. 9, the direction-selective component 167 has anisotropic properties. In the horizontal plane it acts, as before, as a general retroreflector, returning any incident ray substantially in the direction from which it came. Component 167 is formed of transparent material and has on its rear surface an array of fine transparent vertically extending generally cylindrical elements only one of which is seen in the main vertical section, but several of which are shown in the magnified horizontal section 168 and sectioned rear view 169. In fact the elements are not accurately cylindrical as their longitudinal axes are curved, as seen in the vertical section. The elements do, to a good degree of accuracy, have circular cross sections of constant radius. In the series of specific planes which contain the circular cross-sections of the cylinders, the direction-selective elements behave in the same way as the small transparent balls or beads of FIG. 5.

Consider a ray incident on a particular element at an acute angle to a specific plane containing a circular cross-section of that element, which impinges on the element at a particular location in the specific plane. A plane containing the ray and normal to the specific plane intersects the specific plane along a line which contains the normal projection of the incident ray on the specific plane. After impingement, the ray is refracted by the element and reflected from the rear surface which carries a reflective layer, so that the deflected ray leaves the element from a location spaced a small distance from the incident location. After deflection the ray follows a path on the other side of the specific plane at substantially the same acute angle thereto, and the normal projection of this path on the specific plane is substantially co-incident with the line of normal projection of the incident path, allowing for small errors due to imperfections etc. If the back surface had a diffusing layer, a set of substantially co-incident rays at a small angle to the horizontal plane and having a normal projection thereon, would be returned as a set of rays at a variety of angles to the plane although the normal projections of the paths of the rays would all be substantially co-incident with the projection of the path of the incident rays.

An example of a cylindrical element constructed to have good retrodirective properties in one plane is illustrated with reference to FIG. 10. Two cylindrical elements are shown in diagrammatic section with three representative parallel rays of light entering from the left. The upper element on the left is a conventional cylindrical element made of glass of a uniform refractive index of 1.52. The first ray 184 strikes cylinder 183 at an angle of incidence 185 of around 81°, which results in the refracted ray 186 striking the back face of cylinder 183 at a point 187, the same point at which the central ray 188 strikes this face which is provided with a reflecting layer (not shown). The central ray returns down its original path whereas incoming ray 184 exits as ray 189 parallel to and equidistant from ray 188. This condition is not achieved by ray 190 which strikes cylinder 183 at an angle of incidence 191 of 40°. The point 192 at which the refracted ray strikes the back face of cylinder 183 lies on a diameter which is at an angle 193 of approximately 10° to the central ray. This results in a ray 194 which exits the cylinder at an angle 195 of around 20° to the required direction.

The second cylindrical element 196 has good rectrodirective properties for rays incident in the plane of the Figure, and is shown diagrammatically as consisting of two concentric rings 197 and 198, and a central core 199. The outer ring is composed of material of a uniform refractive index of 1.52 and, as before, ray 200 which strikes cylinder 196 at an angle of incidence 201 of around 81° results in a refracted ray 202 which strikes the reflecting back face at a point 203 on the axis of symmetry defined by central ray 204. The parallel ray 205 which strikes cylinder 196 at an angle of incidence 206 around 40° results in a refracted ray 207 which, after passing through ring 197 encounters ring 198. The refractive index of this ring varies as a function of radius, starting at a value of 1.52 to match ring 197 and increasing towards the centre so that, at its inner radius, the refractive index is approximately 1.62. The effect of this refractive index gradient is to bend ray 207, and the values given ensure that, on exiting ring 198, ray 207 proceeds in a straight line to point 203. Reflected ray 208 exits cylinder 196 as ray 209 parallel to incoming ray 205 and equidistant from central ray 204. The outer radius of ring 198 is approximately two thirds of that of cylinder 196, whilst the inner radius is approximately one third. By providing the inner core 199 with a less severe gradient, an arrangement is achieved which brings all parallel rays with an angle of incidence less than 81° to a common focus around point 203 and ensures that these are returned down paths which are substantially parallel to the incoming direction when this is in a plane orthogonal to the longitudinal axis of the retroreflecting cylindrical element 196.

There are well established techniques for making circular section optical fibres with a refractive index which is varied as a precise function of radius. Such techniques can conveniently be used to construct a direction-selective element as described with an outer diameter of, for example, 50 μm. A parallel close packed array of such elements is then assembled behind the rear surface of component 167 in FIG. 9.

It will be apparent that, depending on the refractive index of outer ring 197, its dimensions and the optical precision required, similar results may be achieved with a number of rings of discreet refractive index, maintaining the general principle of a variation from ring to ring as a function of radius. Spherical elements for use in retroreflectors as shown in FIG. 5 may be constructed in a similar manner, with the cylindrical rings replaced by generally spherical shells. Particularly good results are achieved with a precise continuous varying function. Less efficient direction-selective elements (either generally spherical or generally cylindrical) could comprise transparent material of constant refractive index of around 1.9. The elements may have a mirror-like rear surface portion having good reflective properties, or a diffusely reflecting surface portion, producing a spread of rays as discussed above.

Returning to FIG. 9, the direction-selective component 167 may be optimised by suitably selecting the curvatures of its front and rear surfaces. Together with an appropriately small angle between the axes of symmetry of 167 and the incident light bounded by rays 170 and 171, these curves ensure that the reflected light is returned within the bounds of rays 172 and 173 respectively and passes back through lens assembly 165, displaced vertically from the incoming light. To a good approximation, aberrations due to lens 165 are nulled in the horizontal plane in which retrodirective principles are applied. In the vertical plane, aberrations are kept to a minimum given the small height of the lens aperture. Internally reflecting prism 174 separates the returned light and lens assembly 175 produce a reduced image of the object field at the cylindrical lenticular film 176, contained, as before, in a cassette 177. The entire optical path, bounded by rays 178 and 179 in the vertical section illustrated is folded for compactness by mirrors 180, 181 and 182.

The embodiment of FIG. 9 has the advantage that, by removing the need for a partially reflecting and partially transmitting mirror, efficiency in using the available light is increased at least four-fold as compared with the embodiment of FIG. 8. In addition, the camera is more compact for an equivalent picture size.

Figure 11:
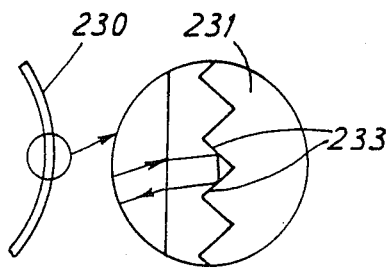
FIG. 11 is an elevational and enlarged sectional view of an alternative embodiment of an anisotropically direction-selective sheet with V-shaped reflecting grooves.

The particular arrangements as illustrated with reference to FIGS. 4 to 9 represent only some of a wide variety of possible embodiments of the present invention. For instance, an alternative construction for an anisotropically direction-selective sheet 230 is illustrated in FIG. 11 and may be based on a series of adjacent 90° V-shaped reflecting grooves 233, shown in horizontal section in detatil 231, each of which returns incident light, over a modest range of angles, as efficiently as the cylindrical elements described with reference to FIG. 10. Further, an anisotropic direction-selective component may be combined with a partially transmitting mirror as used in the camera described with reference to FIG. 8. Direction-selective sheets preferably but not necessarily have a generally reflective layer at or near their rear surfaces so that rays are deflected and returned rather than transmitted, since a compact arrangement of components may then be used.

In the embodiments described, the lenticular film has been located in the image field with image points at various distances from the film (including some points such as R' in FIG. 4 actually in or very close to the plane of the film), both in front of and behind the film. Alternatively, the film (which need not be flat) could be positioned in front of all the image points so that rays impinge on the lenticules before reaching any image points or, if desired, beyond all the image points although in this case the image produced may be found to be difficult to view.

The apertures illustrated have been single slits or rectangular apertures. Two dimensional apertures need not of course be rectangular and other shapes could be selected. Alternative forms of aperture could include a series of small apertures holes of rectangular, circular or other shapes arranged in line to give a similar effect to a single slit-like aperture, or, corresponding to the single rectangular aperture, a two-dimensional array of small apertures. The apertures need not be open simultaneously but could be controlled to open to transmit light in sequence. In all cases, either simultaneously or over a short time interval, the series or array of apertures which is generally in front of or near the imaging means, opens to allow transmission of light rays having paths diverging at wide angles from respective points in the object field.

The imaging means may comprise one or a series of lenses. In most cases, rays from the object field are admitted, either simultaneously or over a short time interval, to a single large convex lens assembly, which may have several components or portions as in the embodiments of FIGS. 8 and 9, and which accepts rays having paths diverging over a range of relatively large angles. The diverging rays over a substantial part (generally substantially the whole) of the range are focussed by the lens to converge towards image points in the region of direction-selective means or, in some cases, the recording means.

The cameras of FIGS. 8 and 9 would normally be used for taking autostereoscopic pictures reproducing the object field as it is visible to the eye, using lenticular film which is sensitive to light in the visible range. These and other embodiments of the invention could be adapted to record autostereoscopic images using rays of longer or shorter wavelengths such as infrared or ultraviolet radiation.

The object field would normally include three dimensional objects or two dimensional objects at different distances from the imaging means. Alternatively, an autostereoscopic image or picture could be placed in the object field for reproduction.

Direction-selective sheets, where used, may take a variety of different forms. They can be formed as retrodirective sheets made up of, for example, cylindrical or spherical elements, or retrodirective properties may be provided by forming grooves, corrugations or an array of small triple mirrors on the front surface of a body or the rear surface of a transparent body.

Instead of being adapted for fast processing, cameras according to the invention could be constructed for use with roll or sheet film, having cylindrical or spheroidal lenticules in front of the photosensitive layer, for subsequent processing as autostereoscopic transparencies or prints. For lenticular transparencies, the colour emulsion may be applied to the rear side of a lenticular screen which thus acts as the film base. This emulsion is exposed through this base and is then developed with chemicals applied from behind.

Figure 12:
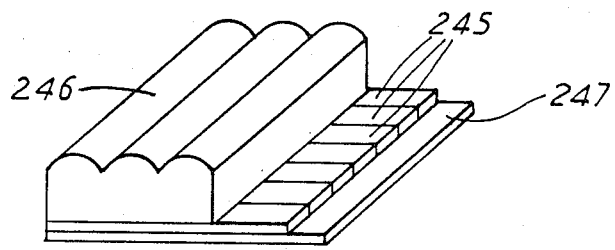
FIG. 12 is a perspective view illustrating a film emulsion with alternating blue, red and green color filters thereon disposed orthogonally to the direction of overlying cylindrical lenticules.
Figure 5:
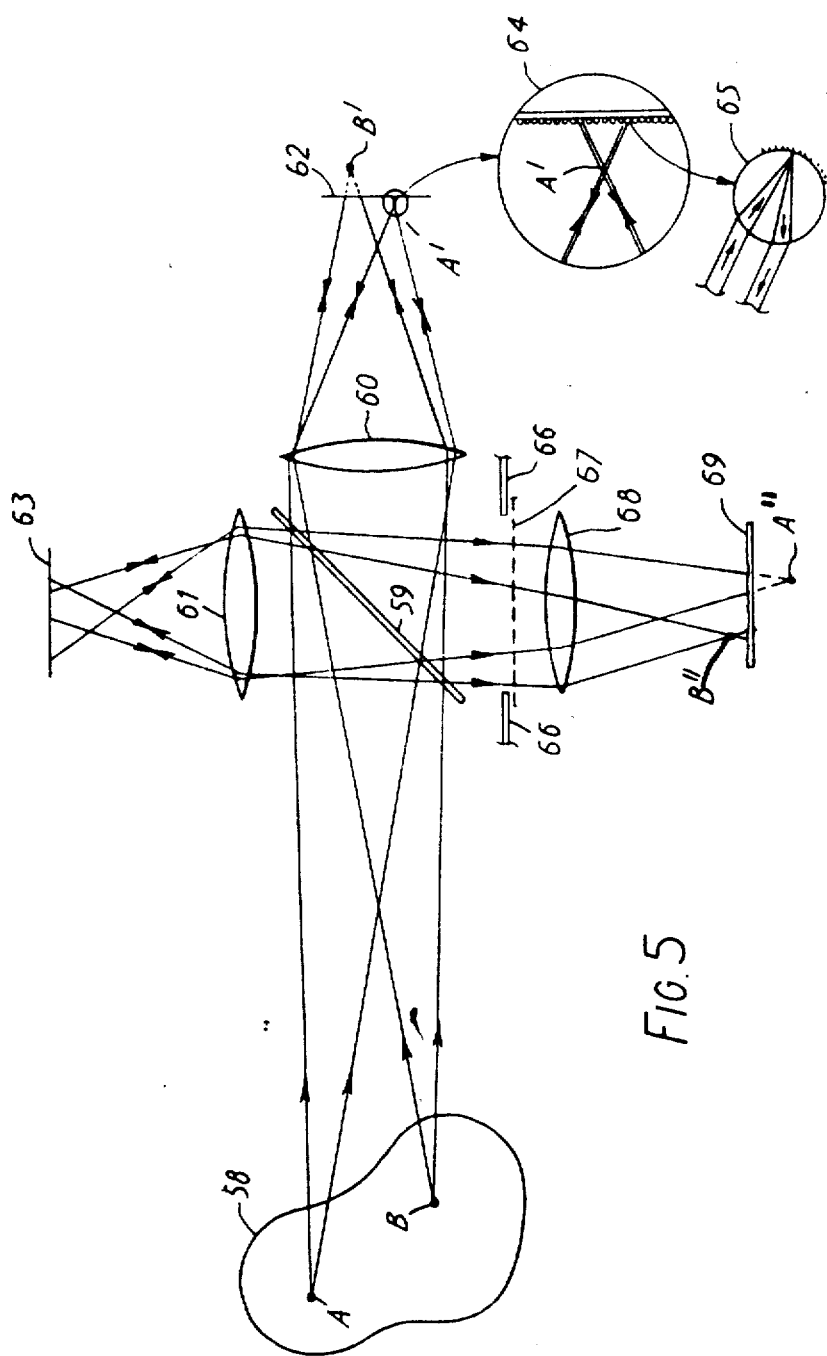

A "rapid-access" or fast processing lenticular film may be constructed using similar principles to that of Polaroid Autoprocess Film. A reversal process is applied during development with chemicals applied from behind the film. As illustrated in FIG. 12, the colour version of this film utilises a closely packed array of narrow colour filters 245 in between the film base and a simple black and white emulsion 247. The emulsion 247 records and, following development, reproduces the image with full colour information as a result of the light, both during exposure and when viewed, passing not only through the emulsion 247 but also through the associated colour filters 245. As a result of alternating blue, red and green filters 245, the image resolution is limited in one direction by these dimensions. In the orthogonal direction however, the full resolution of the photographic emulsion is retained. By arranging the colour filters 245 to run in a direction generally orthogonal to the direction of cylindrical lenticules 246, a high definition may be retained across each lenticule thus enabling production of an autostereoscopic picture having a large number of distinguishable views or perspective of the subject.

The method and apparatus of the invention can also be utilised in conjunction with components of, or associated with, a computer or other electronic device. In the above described methods, stereoscopic information has been recorded on lenticular film, that is a lenticular screen having photographic emulsion either on or near its rear surface. Alternative recording means could be used. For example, after passing through imaging means such as described above, including one or more lenses, preferably one or more direction-selective elements and possibly a semitransparent mirror, rays from the object field converge towards points in an image field in which is located a camera, cathode ray tube or other device having a photosensor so that stereoscopic information may be recorded. Somewhere in the path of rays from the object field to the image field, a series or array of sequentially operable small apertures may be included. If open simultaneously, full stereoscopic information would be transmitted to the recording means. By opening the apertures singly or in groups, two dimensional information or information from a restricted range of perspectives is transmitted to the recording means. By opening all the apertures in turn full details of the object field are recorded over a period of time and the computer or other electronic device is programmed to record a single autostereoscopic image from the information received. The apertures in this case act as incident angle resolving means. Such electronically captured images could be of considerable value in facsimile transmission, for producing three dimensional pictures from hazardous areas, or in applications such as robot vision.

Another alternative would be to have a CRT or other electronic device in the object field, associated with a computer. Computer-generated two dimensional images of different perspectives of an object could be presented separately and in sequence. Direction resolution could be achieved with the aid of a controlled series or array of apertures at or near the imaging means with a lenticular screen in the image field in order to record composite stereoscopic information. This could be of value when used in conjunction with body scanners, in molecular chemistry, or for visualisation of solid models resulting from computer aided design studies.

I claim:

1. Apparatus for use in producing autostereoscopic images, comprising imaging means which comprises convergent optical means, said imaging means being arranged, for any given position thereof relative to an object field, to encounter rays having paths diverging over a range of relatively large angles from respective points in the object field and to converge rays from said points from a substantial part of said range generally towards respective intermediate image points in an intermediate image field; direction-selective means positioned in said intermediate image field and adapted such that rays in a plane which are generally converging relative to one another prior to impingement on said direction-selective means become generally diverging after impingement and rays in said plane which are generally diverging relative to one another prior to impingement become generally converging after impingement on said direction-selective means, said direction-selection means causing respective rays which are incident on said convergent optical means prior to impingement on said direction-selective means to be returned to substantially the same portion of said convergent optical means previously encountered after impingement on the direction-selective means; and means for positioning photosensitive image recording means having a photosensitive layer in an image field spaced from said object field such that rays from said object field returned from said intermediate image field via substantially the same portion of said convergent optical means previously encountered converge towards respective image points in said image field at various points in front of and/or behind the photosensitive layer whereby composite stereoscopic information from said object field is recorded by said recording means for the production of an autostereoscopic image.

2. Apparatus as claimed in claim 1, wherein said imaging means comprises a plurality of said convergent optical means in substantially side by side relationship, so that in use rays from a single point in the object field encounter respectively different convergent optical means prior to incidence on the direction-selective means, are converged generally towards different intermediate image points, and said rays are returned to the same respective convergent optical means as previously encountered, whereby optical aberrations introduced in images in the intermediate image field by said convergent optical means are substantially cancelled by said convergent optical measns before said rays reach the image field.

3. Apparatus as claimed in claim 1 or claim 2, wherein each said convergent optical means comprises a reflecting or a transmitting curved surface in the path of all rays incident on each respective convergent optical means.

4. Apparatus as claimed in claim 1 or claim 2 wherein said direction-selective means is adapted to be retrodirective so that for rays impinging on said direction-selective means at a particular location there is at least one plane containing said location in which there are noncoincident lines of normal projection on said plane of the paths of said impinging rays, which are substantially co-incident with the respective lines of normal projections on said plane of the paths of said rays after impingement said direction-selective means.

5. Apparatus as claimed in claim 4, wherein the direction-selective means comprises an array of retrodirective elements in side-by-side relationship.

6. Apparatus as claimed in claim 5, wherein said elements are adapted to be retroreflective and to deflect rays incident thereon and return said rays substantially along their incident paths.

7. Apparatus as claimed in claim 6, wherein said elements are generally spherical and have a refractive index which varies as a function of radial distance from the centre of the sphere.

8. Apparatus as claimed in claim 5, wherein the elements comprise three generally orthogonal reflective surfaces.

9. Apparatus as claimed in claim 1 or claim 2 including partially reflecting and partially transmitting means in the path of rays from the object field, so that transmitted and/or reflected rays from said reflecting and transmitting means are incident on said direction-selective means.

10. Apparatus as claimed in claim 9, including two direction-selective means positioned in the paths of rays respectively reflected and transmitted by said partially reflecting and partially transmitting means.

11. Apparatus as claimed in claim 1 or claim 2, adapted for movement of said direction-selective means relative to said intermediate image points in said intermediate image field so as to change the location of impingement of rays from the object field on the direction-selective means during recording by the recording means to smooth out the effects of local variations in said direction-selective means on the autostereoscopic image.

12. Apparatus as claimed in claim 1 or claim 2, wherein said imaging means includes auxiliary imaging means distinct from said convergent optical means and spaced from the photosensitive layer position, enabling the production of an autostereoscopic image of a selected size.

13. Apparatus as claimed in claim 1, wherein the imaging means and/or means for positioning has associated therewith incident angle resolving means so that in use rays generally converging towards points in front of and/or behind the photosensitive layer impinge on the photosensitive layer at respective points relating to both direction and position of incidence of the rays whereby directional and positional information is recorded.

14. Apparatus as claimed in claim 13, wherein said resolving means comprises a lenticular screen in front of the photosensitive layer.

15. Apparatus as claimed in claim 14, wherein the lenticular screen comprises a series of lenticules, each presenting a part-cylindrical surface to rays from the object field incident thereon.

16. Apparatus as claimed in claim 14, wherein the lenticular screen comprises an array of lenticules each presenting a part-spheroidal surface to rays from the object field incident thereon.

17. Apparatus as claimed in claim 1 and claim 13, including one or more apertures in the path of rays between the object and image fields.

18. Apparatus as claimed in claim 17, including means for controlling said apertures, adapted selectively to block or allow transmission of rays from the object field to the image field.

19. A camera including apparatus as claimed in claim 1 or claim 2, wherein recording means includes a lenticular screen in front of the photosensitive layer which comprises photographic emulsion.

20. A camera including apparatus as claimed in claim 1 or claim 2, including means for fast processing of an image recorded in use on the photosensitive layer which comprises photographic emulsion.

21. Film comprising a lenticular screen and associated photographic emulsion, for use as said recording means and photosensitive layer in apparatus as claimed in claim 1 or claim 2.

22. Film as claimed in claim 21, wherein the lenticular screen comprises a series of lenticules, each presenting a part-cylindrical surface to rays from the object field incident thereon, and further including elongate colour filters and black and white emulsion, said filters being aligned to lie substantially orthogonal to the longitudinal axes of the lenticules.

23. Film as claimed in claim 21 or claim 22, wherein said film is adapted for fast processing.

24. Apparatus as claimed in claim 1, including a stereoscopic image in the object field for reproduction.

25. A method for producing autostereoscopic images, comprising positioning imaging means which comprises convergent optical means, said imaging means being arranged, for any given position thereof relative to an object field, so as to encounter rays having paths diverging over a range of relatively large angles from respective points in the object field and so as to converge rays from said points from a substantial part of said range generally towards respective intermediate image points in an intermediate image field, positioning direction-selective means in said intermediage image field, said direction-selective means being adapted such that rays in a plane which are generally converging relative to one another prior to impingement on said direction-selective means become generally diverging after impingement and rays in said plane which are generally diverging relative to one another prior to impingement become generally converging after impingement on said direction-selective means, said direction-selective means causing respective rays which are incident on said convergent optical means prior to impingement on said direction-selective means to be returned to substantially the same portion of said convergent optical means previously encountered after impingement on the direction-selective means, and positioning photosensitive image recording means having a photosensitive layer in an image field spaced from said object field such that rays from said object field returned from said intermediage image field via substantially the same portion of said convergent optical means previously encountered converge towards respective image points in said image field at various points in front of and/or behind the photosensitive layer, and subsequently recording composite stereoscopic information from said object field on said recording means and processing said information to produce an autostereoscopic image.

26. Apparatus for use in producing autostereoscopic image, comprising imaging means which comprises convergent optical means, said imaging means being arranged, for any given position thereof relative to an object field, to accept rays having paths diverging over a range of relatively large angles from respective points in the object field and to converge rays from said points from a substantial part of said range generally towards respective intermediate image points in an intermediate image field; direction-selective means positioned in said intermediate image field and adapted such that rays in a plane which are generally converging relative to one another prior to impingement on said direction-selective means become generally diverging after impingement and rays in said plane which are generally diverging relative to one another prior to impingement become generally converging after impingement on said direction-selective means, said direction-selective means causing rays which are incident on said convergent optical means prior to impingement on said direction-selective means to be returned to said convergent optical means after impingement, said direction-selective means being further adapted to be retrodirective, so that for rays impinging at a particular location on said direction-selective means there is a particular plane containing said location in which there are non-coincident lines of normal projection on said particular plane of the paths of said impinging rays which are substantially coincident with the respective lines of normal projection on said particular plane of the paths of said rays after impingement on said direction-selective means, and to cause rays incident on said particular location along planes converging with said particular plane to be returned along displaced paths and to be incident on the convergent optical means previously encountered at points spaced from the points of earlier incidence on said convergent optical means; and means for positioning photosensitive image recording means having a photosensitive layer in an image field spaced from said object field such that rays from said object field returned from said intermediate image field via said convergent optical means converge towards respective image points in said image field at various points in front of and/or behind the photosensitive layer, whereby composite stereoscopic information from said object field is recorded by said recording means for the production of an autostereoscopic image.

27. Apparatus as claimed in claim 26, wherein said imaging means comprises a plurality of said convergent optical means in substantially side-by-side relationship, so that in use rays from a single point in the object field encounter respectively different convergent optical means prior to incidence on the direction-selective means, are converged generally towards different intermediate image points, and said rays are returned to the same respective convergent optical means as previously encountered, whereby optical aberrations introduced in images in the intermediate image field by said convergent optical means are substantially cancelled by said convergent optical means before said rays reach the image field.

28. Apparatus as claimed in claim 26 or claim 27, wherein the direction-selective means comprises an array of retrodirective elements, said elements being generally cylindrical and having a refractive index which varies as a function of radial distance from the central axis.

29. Apparatus as claimed in claim 26 or claim 27, wherein the direction-selective means comprises an array of retrodirective elements, said elements being longitudinally extending channels which are generally 'V'-shaped in cross-section.

30. Apparatus as claimed in claim 26 or claim 27, wherein each said convergent optical means comprises a reflecting or a transmitting curved surface in the path of all rays incident on each respective convergent optical means.

31. Apparatus as claimed in claim 26, including partially reflecting and partially transmitting means in the path of rays from the object field, so that transmitted and/or reflected rays from said reflecting and transmitting means are incident on said direction-selective means.

32. Apparatus as claimed in claim 26 or claim 27, adapted for movement of said direction-selective means relative to said intermediate image points in said intermediate image field so as to change the location of impingement of rays from the object field on the direction-selective means during recording by the recording means to smooth out the effects of local variations in said direction-selective means on the autostereoscopic image.

33. Apparatus as claimed in claim 26 or claim 27, wherein said imaging means includes auxiliary imaging means distinct from said convergent optical means and spaced from the photosensitive layer position, enabling the production of an autostereoscopic image of a selected size.

34. Apparatus as claimed in claim 26, wherein imaging means and/or the means for positioning has associated therewith incident angle resolving means so that in use rays generally converging towards points in front of and/or behind the photosensitive layer impinge on the photosensitive layer at respective points relating to both direction and position of incidence of the rays whereby directional and positional information is recorded.

35. Apparatus as claimed in claim 34, wherein said resolving means comprises a lenticular screen in front of the photosensitive layer.

36. Apparatus as claimed in claim 35, wherein the lenticular screen comprises a series of lenticules, each presenting a part-cylindrical surface to rays from the object field incident thereon.

37. Apparatus as claimed in claim 26, including one or more apertures, in the path of rays between the object field and the image field.

38. Apparatus as claimed in claim 37, including means for controlling said apertures, adapted selectively to block or allow transmission of rays from the object field to the image field.

39. A camera including apparatus as claimed in claim 26, wherein the recording means includes a lenticular screen in front of the photosensitive layer which comprises photographic emulsion.

40. A camera as claimed in claim 26 or claim 27, including means for fast processing of an image recorded on the photosensitive layer which comprises photographic emulsion.

41. Film comprising a lenticular screen and associated photographic emulsion, for use as said recording means and photosensitive layer in apparatus as claimed in claim 26.

42. Film as claimed in claim 41, where the lenticular screen comprises a series of lenticules, each presenting a part-cylindrical surface to rays from the object field incident thereon, and further including elongate colour filters and black and white emulsion, said filters being aligned to lie substantially orthogonal to the longitudinal axes of the lenticules.

43. Film as claimed in claim 41 or claim 42, wherein said film is adapted for fast processing.

44. A method for producing autostereoscopic images, comprising positioning imaging means which comprises convergent optical means, said imaging means being arranged, for any given position thereof relative to an object field, to accept rays having paths diverging over a range of relatively large angles from respective points in the object field and to converge rays from said points from a substantial part of said range generally towards respective intermediate image points in an intermediate image field; positioning direction-selective means in said intermediate image field, said direction-selective means being adapted such that rays in a plane which are generally converging relative to one another prior to impingement on said direction-selective means become generally diverging after impingement and rays in said plane which are generally diverging relative to one another prior to impingement become generally converging after impingement on said direction-selective means and causing rays which are incident on said convergent optical means prior to impingement on said direction-selective means to be returned to said convergent optical means after impingement, said direction-selective means being further adapted to be retrodirective, so that for rays impinging at a particular location on said direction-selective means there is a particular plane containing said location in which there are non-coincident lines of normal projection on said particular plane of the paths of said impinging rays which are substantially coincident with the respective lines of normal projection on said particular plane of the paths of said rays after impingement on said direction-selective means, and to cause rays incident on said particular location along planes converging with said particular plane to be returned along displaced paths and to be incident on the convergent optical means previously encountered at points spaced from the points of earlier incidence on said convergent optical means; and providing means for positioning photosensitive image recording means having a photosensitive layer in an image field spaced from said object field such that rays from said object field returned from said intermediate image field via said convergent optical means converge towards respective image points in said image field at various points in front of and/or behind the photosensitive layer, whereby composite stereoscopic information from said object field in recorded by said recording means for the production of an autostereoscopic image.

* * * * *

UNITED STATES PATENT AND TRADEMARK OFFICE
CERTIFICATE OF CORRECTION

PATENT NO. : 4,552,442

DATED : November 12, 1985

INVENTOR(S) : Graham Stewart Brandon STREET

It is certified that error appears in the above-identified patent and that said Letters Patent is hereby corrected as shown below:

IN THE DRAWINGS, Fig. 5, the lead line of the reference letter --B"-- should point to the dot representative of the convergence point of rays in front (above) of film 69, rather than to film 69 as now shown.

Also the reference letter --A-- in Fig. 5 with a lead line directed to the point of convergence behind (below) film 69 should be changed to --A"--.

Figure 5 should be shown as per attached sheet.

UNITED STATES PATENT AND TRADEMARK OFFICE
CERTIFICATE OF CORRECTION

PATENT NO. : 4,552,442
DATED : November 12, 1985
INVENTOR(S) : Graham Stewart Brandon STREET It is certified that error appears in the above-identified patent and that said Letters Patent is hereby corrected as shown below:

In the Abstract, line 8, change "reture" to --return--.

Column 1, line 42, change "tolerance" to --tolerances--.

Column 2, line 30, change "iminge" to --impinge--.

Column 4, lines 48/49, change "perspective" to --perspectives--.

Column 5, line 15, change "are" to --arc--.

Column 8, line 20, change "0.05" to --0.5--;

Column 8, line 27, change "placed" to --packed--;

Column 8, line 60, change "slighly" to --slightly--.

Column 16, lines 66/67, change "rectrodirective" to --retrodirective--.

Column 18, line 1, change "produce" to --produces--;

Column 18, line 14, change "4" to --5--;

Column 18, line 47, change "apertures" to --aperture--.

Column 19, lines 54/55, change "perspective" to --perspectives--.

UNITED STATES PATENT AND TRADEMARK OFFICE
CERTIFICATE OF CORRECTION

PATENT NO. : 4,552,442

DATED : November 12, 1985

INVENTOR(S) : Graham Stewart Brandon STREET

It is certified that error appears in the above-identified patent and that said Letters Patent is hereby corrected as shown below:

Claim 1, Column 20, lines 49/50, change "direction-selection" to --direction-selective--.

Claim 2, Column 21, line 11, change "measns" to --means--.

Claim 4, Column 21, line 23, change "noncoincident" to --non-coincident--;

Claim 4, Column 21, line 25, change "co-incident" to --coincident--;

Claim 4, Column 21, line 26, change "projections" to --projection--;

Claim 4, Column 21, line 27, after "impingement" insert --on--.

Claim 25, Column 22, line 58, change "intermediage" to --intermediate--;

Claim 25, Column 23, line 8, change "intermediage" to --intermediate--.

Claim 26, Column 23, line 18, change "image" to --images--.

Claim 44, Column 26, line 33, change "in" to --is--.

Signed and Sealed this

Twenty-sixth Day of August 1986

[SEAL]

*Attest:*

DONALD J. QUIGG

*Attesting Officer*   *Commissioner of Patents and Trademarks*